United States Patent
Aota et al.

(10) Patent No.: US 8,430,786 B2
(45) Date of Patent: Apr. 30, 2013

(54) AUTOMATIC TRANSMISSION

(75) Inventors: Kazuaki Aota, Sagamihara (JP); Yukiyoshi Inuta, Isehara (JP); Akihiro Yamamoto, Isehara (JP); Takayuki Okuda, Atsugi (JP); Kouichi Iizuka, Fuji (JP)

(73) Assignee: Jatco Ltd, Fuji-shi (JP)

( * ) Notice: Subject to any disclaimer, the term of this patent is extended or adjusted under 35 U.S.C. 154(b) by 165 days.

(21) Appl. No.: 12/947,378

(22) Filed: Nov. 16, 2010

(65) Prior Publication Data

US 2011/0136616 A1 Jun. 9, 2011

(30) Foreign Application Priority Data

Dec. 7, 2009 (JP) ................. 2009-277266

(51) Int. Cl.
*F16H 3/62* (2006.01)
(52) U.S. Cl.
USPC ........................................... 475/279
(58) Field of Classification Search ............... None
See application file for complete search history.

(56) References Cited

U.S. PATENT DOCUMENTS

| | | | |
|---|---|---|---|
| 5,133,697 A | 7/1992 | Hattori | |
| 6,746,358 B2 | 6/2004 | Bucknor et al. | |
| 6,932,735 B2 | 8/2005 | Kao et al. | |
| 7,086,986 B2 | 8/2006 | Raghavan et al. | |
| 7,094,173 B2 | 8/2006 | Raghavan et al. | |
| 7,611,438 B2 | 11/2009 | Diosi et al. | |
| 7,686,732 B2 | 3/2010 | Raghavan et al. | |
| 7,731,622 B2 | 6/2010 | Wittkopp et al. | |
| 8,047,953 B2 | 11/2011 | Wittkopp et al. | |

(Continued)

FOREIGN PATENT DOCUMENTS

| DE | 10 2004 041 446 A1 | 3/2006 |
|---|---|---|
| EP | 1 398 528 A2 | 3/2004 |
| EP | 1 398 533 A2 | 3/2004 |
| JP | 2001-182785 A | 7/2001 |

OTHER PUBLICATIONS

K. Aota, U.S. PTO Office Action, U.S. Appl. No. 12/731,892, dated Apr. 20, 2012, 21 pages.
U.S. Appl. No. 12/731,899, filed Mar. 25, 2010, Aota et al.

(Continued)

*Primary Examiner* — David D Le
*Assistant Examiner* — Erin D Bishop
(74) *Attorney, Agent, or Firm* — Foley & Lardner LLP

(57) ABSTRACT

An automatic transmission including a single-pinion first planetary gearset having a first sun gear, a first ring gear and a first pinion carrier, a double-pinion second planetary gearset having a second sun gear, a second ring gear and a second pinion carrier, a single-pinion third planetary gearset having a third sun gear, a third ring gear and a third pinion carrier, an input shaft always connected to the first sun gear, an output shaft always connected to the first pinion carrier, the third sun gear always kept in a fixed state, the first ring gear and the second sun gear which are always connected to each other, the second and third ring gears which are always connected to each other, and six friction elements, at least eight forward speeds and one reverse speed being respectively established by simultaneous engagement of two friction elements selected from the six friction elements.

4 Claims, 11 Drawing Sheets

U.S. PATENT DOCUMENTS

| | | |
|---|---|---|
| 2003/0232687 A1 | 12/2003 | Buchnor et al. |
| 2004/0229725 A1 | 11/2004 | Hiraiwa |
| 2005/0090362 A1 | 4/2005 | Abe et al. |
| 2006/0148610 A1 | 7/2006 | Usoro et al. |
| 2007/0213169 A1 | 9/2007 | Gumpoltsberger |
| 2007/0259753 A1 | 11/2007 | Diosi et al. |
| 2008/0242479 A1 | 10/2008 | Hart et al. |
| 2008/0242484 A1 | 10/2008 | Hart et al. |
| 2008/0293535 A1 | 11/2008 | Phillips et al. |
| 2008/0300088 A1 | 12/2008 | Hart et al. |
| 2009/0023535 A1 | 1/2009 | Wittkopp et al. |
| 2009/0023538 A1 | 1/2009 | Carey et al. |
| 2009/0036254 A1 | 2/2009 | Wittkopp et al. |
| 2009/0048061 A1* | 2/2009 | Hart et al. .................... 475/275 |
| 2009/0215579 A1 | 8/2009 | Phillips |
| 2010/0184553 A1 | 7/2010 | Wittkopp et al. |

OTHER PUBLICATIONS

U.S. Appl. No. 12/731,892, filed Mar. 25, 2010, Aota et al.
U.S. Appl. No. 12/847,380, filed Jul. 30, 2010, Yamamoto et al.
U.S. Appl. No. 12/847,421, filed Jul. 30, 2010, Yamamoto et al.
K. Aota, U.S. PTO Notice of Allowance and Allowability, U.S. Appl. No. 12/731,899, dated Sep. 22, 2011, 17 pages.
A. Yamamoto, U.S. PTO Office Action, U.S. Appl. No. 12/847,380, dated Nov. 7, 2011, 12 pages.
K. Aota, U.S. PTO Notice of Allowance, U.S. Appl. No. 12/731,892, dated Oct. 1, 2012, 8 pages.
A. Yamamoto, U.S. Notice of Allowance, U.S. Appl. No. 12/847,421, dated Oct. 26, 2012, 9 pages.
A. Yamamoto, U.S. PTO Office Action, U.S. Appl. No. 12/847,421, dated Jul. 23, 2012, 19 pages.

* cited by examiner

|  | C1 | C2 | C3 | C4 | C5 | B1 | GEAR RATIO | STEP RATIO |
|---|---|---|---|---|---|---|---|---|
| 1st |  |  |  | ○ |  | ○ | 4.915 | 1.578 |
| 2nd |  | ○ |  |  |  | ○ | 3.114 | 1.550 |
| 3rd |  | ○ |  | ○ |  |  | 2.009 | 1.358 |
| 4th |  | ○ | ○ |  |  |  | 1.479 | 1.182 |
| 5th |  | ○ |  |  | ○ |  | 1.251 | 1.251 |
| 6th |  | ○ |  |  | ○ |  | 1.000 | 1.171 |
| 7th | ○ |  |  |  | ○ |  | 0.854 | 1.306 |
| 8th | ○ |  | ○ |  |  |  | 0.654 |  |
| Rev |  |  | ○ |  |  | ○ | -3.888 | 1.264 |

ρ1 = 0.420
ρ2 = -0.540   RC = 7.515
ρ3 = 0.473    Rev/1st = 0.791

GEAR MESHING NUMBER

SINGLE PINION: 2
DOUBLE PINION: 3

|  | 1st | 2nd | 3rd | 4th | 5th | 6th | 7th | 8th | AVERAGE MESHING NUMBER |
|---|---|---|---|---|---|---|---|---|---|
| PLANETARY GEAR SET 1 | 2 | 2 | 2 | 2 | 2 | 0 | 2 | 2 | — |
| PLANETARY GEAR SET 2 | 3 | 0 | 3 | 3 | 0 | 0 | 3 | 3 | — |
| PLANETARY GEAR SET 3 | 0 | 0 | 2 | 2 | 2 | 0 | 2 | 2 | — |
| total | 5 | 2 | 7 | 7 | 4 | 0 | 7 | 7 | 4.88 |

DOUBLE-PINION PLANETARY GEAR SET
RAVIGNEAUX PLANETARY GEAR UNIT
(ONE DOUBLE PINION AND ONE SINGLE PINION)
B1  B2

|  | C1 | C2 | C3 | C4 | B1 | B2 | GEAR RATIO |
|---|---|---|---|---|---|---|---|
| 1st | ○ |  |  |  |  | ○ | 4.267 |
| 2nd | ○ |  |  |  | ○ |  | 2.489 |
| 3rd | ○ | ○ |  |  |  |  | 1.600 |
| 4th | ○ |  |  | ○ |  |  | 1.318 |
| 5th | ○ |  | ○ |  |  |  | 1.164 |
| 6th |  |  | ○ | ○ |  |  | 1.000 |
| 7th |  | ○ | ○ |  |  |  | 0.842 |
| 8th |  |  | ○ |  |  | ○ | 0.667 |
| Rev1 |  | ○ |  |  |  | ○ | 3.200 |
| Rev2 |  |  |  | ○ |  | ○ | 2.000 |

GEAR MESHING NUMBER

SINGLE PINION: 2
DOUBLE PINION: 3

|  | 1st | 2nd | 3rd | 4th | 5th | 6th | 7th | 8th | AVERAGE MESHING NUMBER |
|---|---|---|---|---|---|---|---|---|---|
| PLANETARY GEAR SET 1 | 3 | 3 | 3 | 3 | 3 | 0 | 3 | 0 | — |
| PLANETARY GEAR SET 2 | 0 | 2 | 0 | 2 | 0 | 0 | 2 | 2 | — |
| PLANETARY GEAR SET 3 | 3 | 3 | 0 | 3 | 3 | 0 | 0 | 0 | — |
| total | 6 | 8 | 3 | 8 | 6 | 0 | 5 | 2 | 4.75 |

| | RC = 5.00 | |
|---|---|---|
| | GEAR RATIO | STEP RATIO |
| 1st | 3.576 | 1.440 |
| 2nd | 2.484 | 1.457 |
| 3rd | 1.705 | 1.221 |
| 4th | 1.396 | 1.164 |
| 5th | 1.199 | 1.199 |
| 6th | 1.000 | 1.122 |
| 7th | 0.891 | 1.246 |
| 8th | 0.715 | |

| | RC = 7.02 | |
|---|---|---|
| | GEAR RATIO | STEP RATIO |
| 1st | 4.631 | 1.564 |
| 2nd | 2.961 | 1.529 |
| 3rd | 1.936 | 1.324 |
| 4th | 1.462 | 1.175 |
| 5th | 1.244 | 1.244 |
| 6th | 1.000 | 1.167 |
| 7th | 0.857 | 1.298 |
| 8th | 0.660 | |

| | RC = 9.01 | |
|---|---|---|
| | GEAR RATIO | STEP RATIO |
| 1st | 5.823 | 1.631 |
| 2nd | 3.571 | 1.628 |
| 3rd | 2.194 | 1.461 |
| 4th | 1.502 | 1.190 |
| 5th | 1.262 | 1.262 |
| 6th | 1.000 | 1.182 |
| 7th | 0.846 | 1.310 |
| 8th | 0.646 | |

AUTOMATIC TRANSMISSION

BACKGROUND OF THE INVENTION

The present invention relates to an automatic transmission for a vehicle in which multiple speeds (or multiple gear stages) or a wide gear ratio range are required.

Conventionally, there have been proposed various multiple-speed automatic transmissions that realize eight forward speeds using three planetary gearsets and six friction elements. For example, Japanese Patent Application Unexamined Publication No. 2001-182785 discloses such an eight forward-speed transmission that includes a double-pinion planetary gearset, a Ravigneaux planetary gear unit (i.e., a combination of a double-pinion planetary gearset and a single-pinion planetary gearset), four clutches, and two brakes.

However, in the automatic transmission of the above reference example which realizes eight forward speeds using three planetary gearsets and six friction elements, the following problems are caused due to the two double-pinion planetary gearsets used in the automatic transmission.
(1) A diameter of the pinion gears is reduced to thereby lower endurance reliability of the transmission.
(2) The number of parts in the transmission is increased to thereby cause increase in cost.

BRIEF SUMMARY OF THE INVENTION

The present invention has been made in view of the above problems. It is an object of the present invention to provide an automatic transmission that realizes eight forward speeds by using three planetary gearsets and six friction elements and is advantageous in view of endurance reliability and cost performance.

In one aspect of the present invention, there is provided an automatic transmission including:
a first planetary gearset including a first sun gear, a first ring gear and a first pinion carrier as a single-pinion carrier which supports a first pinion gear meshing with the first sun gear and the first ring gear;
a second planetary gearset including a second sun gear, a second ring gear and a second pinion carrier as a double-pinion carrier which supports second pinion gears, one of the second pinion gears meshing with the second sun gear, the other of the second pinion gears meshing with the second ring gear,
a third planetary gearset including a third sun gear, a third ring gear and a third pinion carrier as a single-pinion carrier which supports a third pinion gear meshing with the third sun gear and the third ring gear;
an input shaft;
an output shaft; and
six friction elements,
the automatic transmission being capable of shifting a gear stage to at least eight forward speeds by appropriately engaging and disengaging the six friction elements to thereby output a torque from the input shaft to the output shaft,
wherein the input shaft is always connected to the first sun gear,
the output shaft is always connected to the first pinion carrier,
the third sun gear is always kept in a fixed state relative to a transmission case of the automatic transmission to constitute a first fixing member,
the first ring gear and the second sun gear are always connected to each other to constitute a first rotary member,
the second ring gear and the third ring gear are always connected to each other to constitute a second rotary member,
the six friction elements are constituted of a first friction element which selectively connects the second pinion carrier and the third pinion carrier, a second friction element which selectively connects the third pinion carrier and the first rotary member, a third friction element which selectively connects the first sun gear and the second pinion carrier, a fourth friction element which selectively connects the first pinion carrier and the second pinion carrier, a fifth friction element which selectively connects the first sun gear and the second rotary member, and a sixth friction element which is capable of interrupting rotation of the second rotary member, and
the at least eight forward speeds and one reverse speed are respectively established by simultaneous engagement of two friction elements selected from the six friction elements.

In a further aspect of the present invention, there is provided an automatic transmission comprising:
a first planetary gearset including a first sun gear, a first ring gear and a first pinion carrier as a single-pinion carrier which supports a first pinion gear meshing with the first sun gear and the first ring gear;
a second planetary gearset including a second sun gear, a second ring gear and a second pinion carrier as a double-pinion carrier which supports second pinion gears, one of the second pinion gears meshing with the second sun gear, the other of the second pinion gears meshing with the second ring gear,
a third planetary gearset including a third sun gear, a third ring gear and a third pinion carrier as a single-pinion carrier which supports a third pinion gear meshing with the third sun gear and the third ring gear;
an input shaft;
an output shaft; and
six friction elements,
the automatic transmission being capable of shifting a gear stage to at least eight forward speeds by appropriately engaging and disengaging the six friction elements to thereby output a torque from the input shaft to the output shaft,
wherein the input shaft is always connected to the third sun gear,
the output shaft is always connected to the third pinion carrier,
the first sun gear is always kept in a fixed state relative to a transmission case of the automatic transmission to constitute a first fixing member,
the second sun gear and the third ring gear are always connected to each other to constitute a first rotary member,
the first ring gear and the second ring gear are always connected to each other to constitute a second rotary member,
the six friction elements are constituted of a first friction element which selectively connects the first pinion carrier and the second pinion carrier, a second friction element which selectively connects the first pinion carrier and the first rotary member, a third friction element which selectively connects the second pinion carrier and the third sun gear, a fourth friction element which selectively connects the second pinion carrier and the third pinion carrier, a fifth friction element which selectively connects the third sun gear and the second rotary member, and a sixth friction element which is capable of interrupting rotation of the second rotary member, and
the at least eight forward speeds and one reverse speed are respectively established by simultaneous engagement of two friction elements selected from the six friction elements.

DETAILED DESCRIPTION OF THE INVENTION

First and second embodiments of the present invention will be explained hereinafter with reference to the accompanying drawings.

First Embodiment

Figures 1, 2, 3:
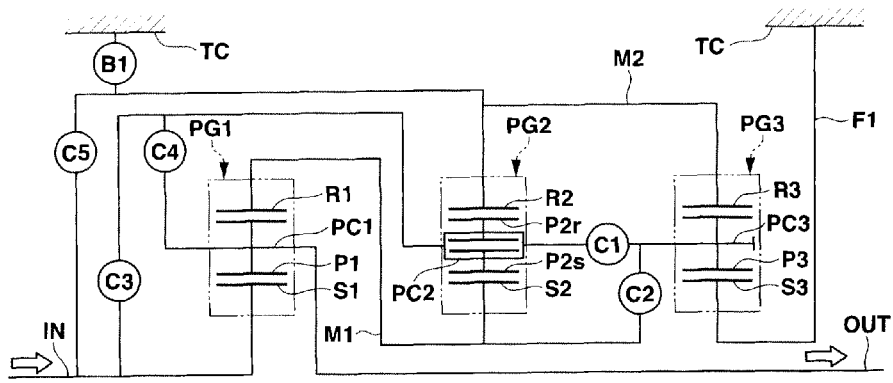
FIG. 1 is a skeleton diagram showing an automatic transmission according to a first embodiment of the present invention.
FIG. 2 is a table showing an engagement schedule of six friction elements of the automatic transmission according to the first embodiment for establishing eight forward speeds and one reverse speed by simultaneous engagement of specific two friction elements selected from the six friction elements.
FIG. 3 is a table showing the number of meshing engagement between gears at the respective eight forward speeds in the automatic transmission according to the first embodiment.

FIG. 1 is a skeleton diagram showing the automatic transmission according to the first embodiment. A construction of planetary gearsets and a construction of friction elements in the automatic transmission according to the first embodiment are explained by referring to FIG. 1.

As shown in FIG. 1, the automatic transmission according to the first embodiment includes first planetary gearset PG1, second planetary gearset PG2, third planetary gearset PG3, input shaft IN, output shaft OUT, first fixing member F1, first rotary member M1, second rotary member M2, first clutch C1 (i.e., first friction element), second clutch C2 (i.e., second friction element), third clutch C3 (i.e., third friction element), fourth clutch C4 (i.e., fourth friction element), fifth clutch C5 (i.e., fifth friction element), first brake B1 (i.e., sixth friction element), and transmission case TC.

First planetary gearset PG1 is a single-pinion planetary gearset including first sun gear S1, first pinion carrier PC1 as a single-pinion carrier which supports first pinion gear P1, and first ring gear R1. First pinion gear P1 is in meshing engagement with first sun gear S1. First ring gear R1 is in meshing engagement with first pinion gear P1.

Second planetary gearset PG2 is a double-pinion planetary gearset including second sun gear S2, second pinion carrier PC2 as a double-pinion carrier which supports second pinion gears P2s and P2r, and second ring gear R2. Pinion gear P2s is in meshing engagement with second sun gear S2. Pinion gear P2r is in meshing engagement with pinion gear P2s and second ring gear R2.

Third planetary gearset PG3 is a single-pinion planetary gearset including third sun gear S3, third pinion carrier PC3 as a single-pinion carrier which supports third pinion gear P3, and third ring gear R3. Third pinion gear P3 is in meshing engagement with third sun gear S3. Third ring gear R3 is in meshing engagement with third pinion gear P3.

Input shaft IN receives a driving torque which is transmitted from a drive source such as an engine via a torque converter and the like. Input shaft IN is always connected to first sun gear S1.

Output shaft OUT outputs a driving torque after shifting to a driving wheel through a propeller shaft, a final gear and the like. Output shaft OUT is always connected to first pinion carrier PC1.

First fixing member F1 always fixes third sun gear S3 to transmission case TC.

First rotary member M1 is a rotary member which always connects first ring gear R1 and second sun gear S2 to each other without intervention of a friction element.

Second rotary member M2 is a rotary member which always connects second ring gear R2 and third ring gear R3 to each other without intervention of a friction element.

First clutch C1 is a first friction element which selectively connects second pinion carrier PC2 and third pinion carrier PC3.

Second clutch C2 is a second friction element which selectively connects third pinion carrier PC3 and first rotary member M1.

Third clutch C3 is a third friction element which selectively connects first sun gear S1 and second pinion carrier PC2.

Fourth clutch C4 is a fourth friction element which selectively connects first pinion carrier PC1 and second pinion carrier PC2.

Fifth clutch C5 is a fifth friction element which selectively connects first sun gear S1 and second rotary member M2.

First brake B1 is a sixth friction element which is capable of interrupting rotation of second rotary member M2 relative to transmission case TC. First brake B1 is disposed in an upstream position of first planetary gearset PG1 on the side of the drive source.

First planetary gearset PG1, second planetary gearset PG2 and third planetary gearset PG3 are arranged in this order in a direction extending from input shaft IN to be connected with the drive source toward output shaft OUT as shown in FIG. 1.

FIG. 2 is a table showing an engagement schedule of the six friction elements of the automatic transmission according to the first embodiment, in which gear stages, that is, eight forward speeds and one reverse speed, are respectively established by simultaneous engagement of two friction elements selected from the six friction elements. FIG. 3 is a table showing the number of meshing engagement between adjacent two gears of the respective first to third planetary gearsets to establish the respective eight forward speeds in the automatic transmission according to the first embodiment. Referring to FIG. 2 and FIG. 3, a shift construction to establish the respective gear stages in the automatic transmission according to the first embodiment will be explained hereinafter.

The automatic transmission according to the first embodiment establishes the respective gear stages, that is, eight forward speeds and one reverse speed by simultaneous engagement of two friction elements selected from the six friction elements C1, C2, C3, C4, C5 and B1, as explained below.

As shown in FIG. 2, the first speed (1st) is established by simultaneous engagement of fourth clutch C4 and first brake B1. As shown in FIG. 3, first planetary gearset PG1 and second planetary gearset PG2 are concerned with establishment of the first speed, and therefore, the number (or frequency) of meshing engagement between mutually meshed two gears (hereinafter simply referred to as the gear meshing number) at the first speed is 5 (i.e., 2+3+0) in total.

As shown in FIG. 2, the second speed (2nd) is established by simultaneous engagement of second clutch C2 and first brake B1. As shown in FIG. 3, only first planetary gearset PG1 is concerned with establishment of the second speed, and therefore, the gear meshing number at the second speed is 2 (i.e., 2+0+0) in total.

As shown in FIG. 2, the third speed (3rd) is established by simultaneous engagement of second clutch C2 and fourth clutch C4. As shown in FIG. 3, first planetary gearset PG1, second planetary gearset PG2 and third planetary gearset PG3 are concerned with establishment of the third speed, and therefore, the gear meshing number at the third speed is 7 (i.e., 2+3+2) in total.

As shown in FIG. 2, the fourth speed (4th) is established by simultaneous engagement of second clutch C2 and third clutch C3. As shown in FIG. 3, first planetary gearset PG1, second planetary gearset PG2 and third planetary gearset PG3 are concerned with establishment of the fourth speed, and therefore, the gear meshing number at the fourth speed is 7 (i.e., 2+3+2) in total.

As shown in FIG. 2, the fifth speed (5th) is established by simultaneous engagement of second clutch C2 and fifth clutch C5. As shown in FIG. 3, first planetary gearset PG1 and third planetary gearset PG3 are concerned with establishment of the fifth speed, and therefore, the gear meshing number at the fifth speed is 4 (i.e., 2+0+2) in total.

As shown in FIG. 2, the sixth speed (6th) is established by simultaneous engagement of third clutch C3 and fifth clutch C5. As shown in FIG. 3, none of first planetary gearset PG1, second planetary gearset PG2 and third planetary gearset PG3 is concerned with establishment of the sixth speed, and therefore, the gear meshing number at the sixth speed is 0 in total.

As shown in FIG. 2, the seventh speed (7th) is established by simultaneous engagement of first clutch C1 and fifth clutch C5. As shown in FIG. 3, first planetary gearset PG1, second planetary gearset PG2 and third planetary gearset PG3 are concerned with establishment of the seventh speed, and therefore, the gear meshing number at the seventh speed is 7 (i.e., 2+3+2) in total.

As shown in FIG. 2, the eighth speed (8th) is established by simultaneous engagement of first clutch C1 and third clutch C3. As shown in FIG. 3, first planetary gearset PG1, second planetary gearset PG2 and third planetary gearset PG3 are concerned with establishment of the eighth speed, and therefore, the gear meshing number at the eighth speed is 7 (i.e., 2+3+2) in total.

As shown in FIG. 2, the reverse speed (Rev) is established by simultaneous engagement of third clutch C3 and first brake B1.

An operation of the automatic transmission according to the first embodiment will be explained hereinafter with respect to "a shift operation at the respective gear stages" and "an advantage in comparison to a reference example".

[Shift Operation at Respective Gear Stages]

Referring to FIG. 4 to FIG. 12, the shift operation at the respective gear stages is explained.

(First Speed)

Figure 4:
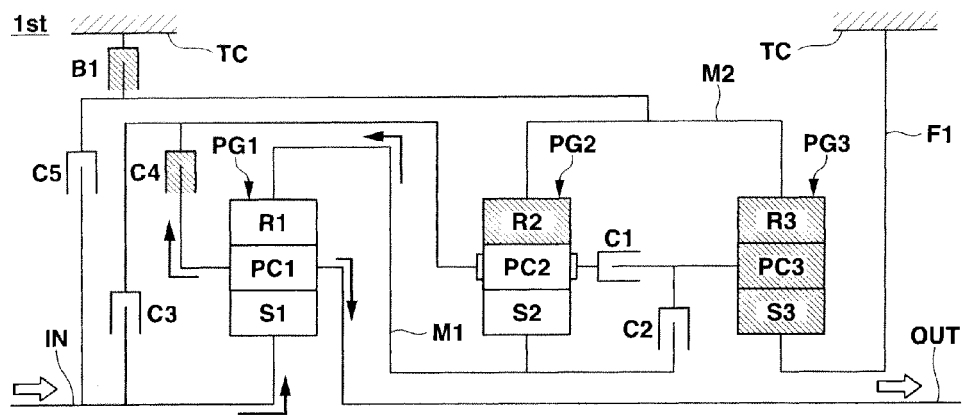
FIG. 4 is an explanatory diagram showing a shift operation at a first speed (1st) in the automatic transmission according to the first embodiment.

At the first speed (1st), fourth clutch C4 and first brake B1 are brought into simultaneous engagement as indicated by hatching in FIG. 4.

First pinion carrier PC1 and second pinion carrier PC2 are directly connected to each other by the engagement of fourth clutch C4. The three rotary elements S3, PC3, R3 of third planetary gearset PG3 are unitarily fixed to transmission case TC and second ring gear R2 is fixed to transmission case TC, by the engagement of first brake B1, second rotary member M2 and first fixing member F1.

As shown in FIG. 4, when input rotation from the drive source is inputted through input shaft IN to first sun gear S1, first pinion carrier PC1 and first ring gear R1 of first planetary gearset PG1 are rotated with restraint due to rotation of second sun gear S2 and second pinion carrier PC2 of second planetary gearset PG2 with second ring gear R2 being kept fixed. In this state, the restraint conditions are: (a) first pinion carrier PC1 and second pinion carrier PC2 are kept rotating at the same speed through fourth clutch C4; and (b) first ring gear R1 and second sun gear S2 are kept rotating at the same speed through first rotary member M1. On the basis of this rotation restraint relationship, the rotation speed of first pinion carrier PC1 becomes a reduced input rotation speed. The rotation outputted from first pinion carrier PC1 (that is, rotation having a speed lower than the input rotation speed) is transmitted to output shaft OUT without change so that the first speed is established.

(Second Speed)

Figure 5:
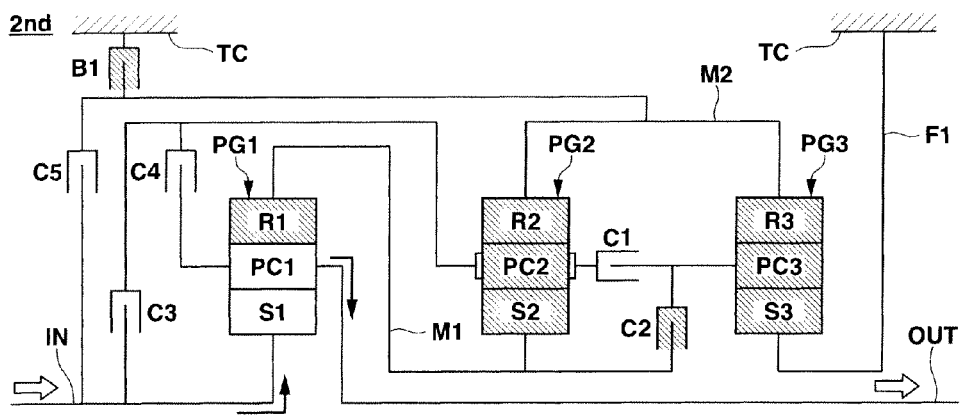
FIG. 5 is an explanatory diagram showing a shift operation at a second speed (2nd) in the automatic transmission according to the first embodiment.

At the second speed (2nd), second clutch C2 and first brake B1 are brought into simultaneous engagement as indicated by hatching in FIG. 5.

The three rotary elements S2, PC2, R2 of second planetary gearset PG2 are unitarily fixed to transmission case TC, the three rotary elements S3, PC3, R3 of third planetary gearset PG3 are unitarily fixed to transmission case TC, and first ring gear R1 is fixed to transmission case TC, by the simultaneous engagement of second clutch C2 and first brake B1 and by first and second rotary members M1, M2 and first fixing member F1.

As shown in FIG. 5, when input rotation from the drive source is inputted through input shaft IN to first sun gear S1, first planetary gearset PG1 with first ring gear R1 being kept fixed is operated to reduce the input rotation speed and output the speed-reduced rotation from first pinion carrier PC1. The speed-reduced rotation outputted from first pinion carrier PC1 (that is, rotation having a speed lower than the input rotation speed and higher than the first speed) is transmitted to output shaft OUT without change so that the second speed is established.

(Third Speed)

Figure 6:
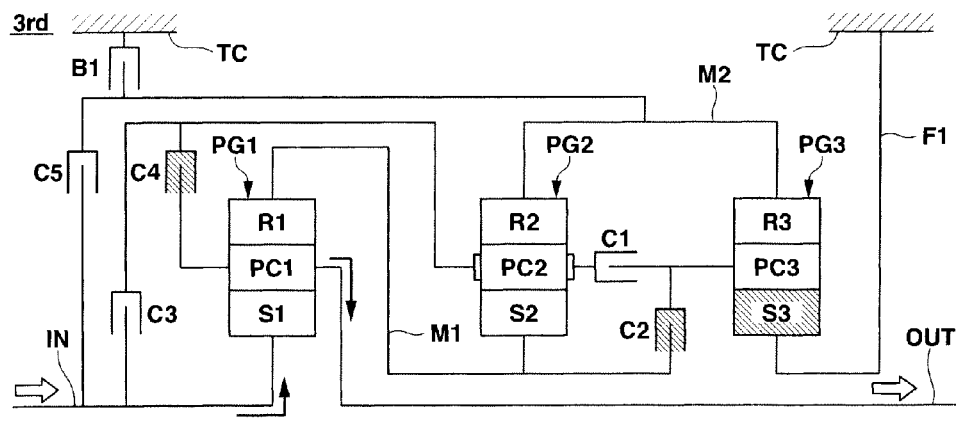
FIG. 6 is an explanatory diagram showing a shift operation at a third speed (3rd) in the automatic transmission according to the first embodiment.

At the third speed (3rd), second clutch C2 and fourth clutch C4 are brought into simultaneous engagement as indicated by hatching in FIG. 6.

First ring gear R1, second sun gear S2 and third pinion carrier PC3 are directly connected to each other by the engagement of second clutch C2 and first rotary member M1. First pinion carrier PC1 and second pinion carrier PC2 are directly connected to each other by the engagement of fourth clutch C4.

As shown in FIG. 6, when input rotation from the drive source is inputted through input shaft IN to first sun gear S1, first pinion carrier PC1 and first ring gear R1 of first planetary gearset PG1 are rotated with restraint due to rotation of second sun gear S2 and second pinion carrier PC2 of second planetary gearset PG2. Second sun gear S2 and second ring gear R2 of second planetary gearset PG2 are rotated with restraint due to rotation of third pinion carrier PC3 and third ring gear R3 of third planetary gearset PG3 with third sun gear S3 being kept fixed. In this state, the restraint conditions are: (a) first ring gear R1, second sun gear S2 and third pinion carrier PC3 are kept rotating at the same speed through second clutch C2 and first rotary member M1; (b) first pinion carrier PC1 and second pinion carrier PC2 are kept rotating at the same speed through fourth clutch C4; and (c) second ring gear R2 and third ring gear R3 are kept rotating at the same speed through second rotary member M2. On the basis of this rotation restraint relationship, the rotation speed of first pinion carrier PC1 becomes a reduced input rotation speed. The rotation outputted from first pinion carrier PC1 (that is, rotation having a speed lower than the input rotation speed and higher than the second speed) is transmitted to output shaft OUT without change so that the third speed is established.

(Fourth Speed)

Figure 7:
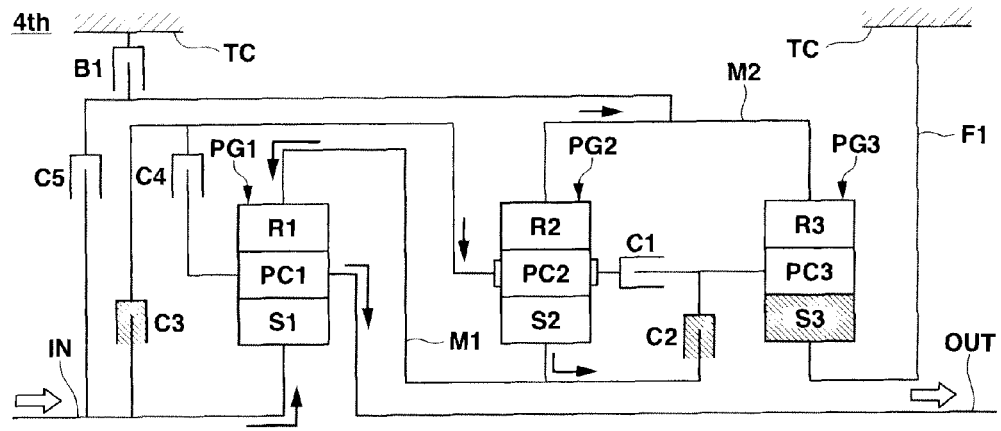
FIG. 7 is an explanatory diagram showing a shift operation at a fourth speed (4th) in the automatic transmission according to the first embodiment.

At the fourth speed (4th), second clutch C2 and third clutch C3 are brought into simultaneous engagement as indicated by hatching in FIG. 7.

First ring gear R1, second sun gear S2 and third pinion carrier PC3 are directly connected to each other by the engagement of second clutch C2 and first rotary member M1. Input shaft IN, first sun gear S1 and second pinion carrier PC2 are directly connected to each other by the engagement of third clutch C3.

As shown in FIG. 7, when input shaft IN is rotated at a speed inputted from the drive source, second sun gear S2 and second ring gear R2 of second planetary gearset PG2 are rotated with restraint due to rotation of third pinion carrier PC3 and third ring gear R3 of third planetary gearset PG3 with third sun gear S3 being kept fixed. In this state, the restraint conditions are: (a) second sun gear S2 and third pinion carrier PC3 are kept rotating at the same speed through second clutch C2; and (b) second ring gear R2 and third ring gear R3 are kept rotating at the same speed through second rotary member M2. On the basis of this rotation restraint relationship, the rotation speed of second sun gear S2 and third pinion carrier PC3 is determined, and the rotation speed thus determined is inputted to first ring gear R1 through first rotary member M1 without change. As a result, in first planetary gearset PG1 having two inputs and one output, the rotation speed of first sun gear S1 (i.e., the input rotation speed) and the rotation speed of first ring gear R1 are determined, whereby the rotation speed of first pinion carrier PC1 is determined. The rotation outputted from first pinion carrier PC1 (that is, rotation having a speed lower than the input rotation speed and higher than the third speed) is transmitted to output shaft OUT without change so that the fourth speed is established.

(Fifth Speed)

Figure 8:
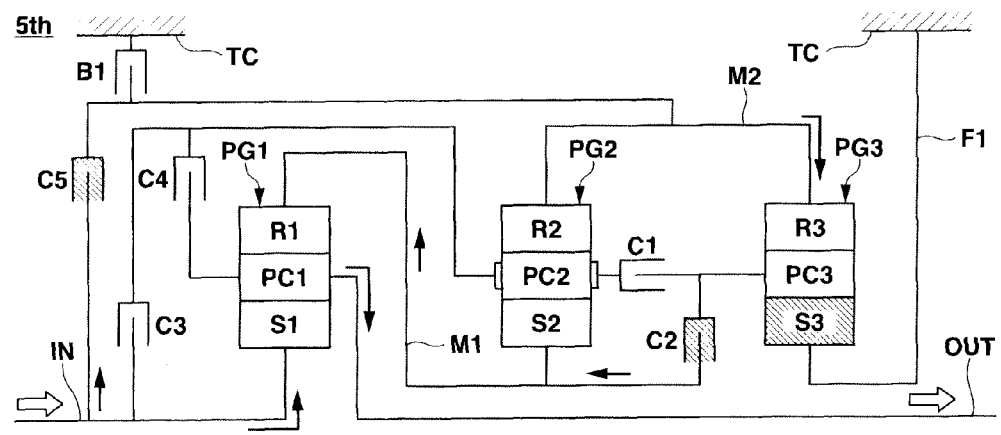
FIG. 8 is an explanatory diagram showing a shift operation at a fifth speed (5th) in the automatic transmission according to the first embodiment.

At the fifth speed (5th), second clutch C2 and fifth clutch C5 are brought into simultaneous engagement as indicated by hatching in FIG. 8.

First ring gear R1, second sun gear S2 and third pinion carrier PC3 are directly connected to each other by the engagement of second clutch C2 and first rotary member M1. Input shaft IN, first sun gear S1, second ring gear R2 and third ring gear R3 are directly connected to each other by the engagement of fifth clutch C5 and second rotary member M2.

As shown in FIG. 8, when input shaft IN is rotated at a speed of rotation inputted from the drive source, first sun gear S1 and first ring gear R1 of first planetary gearset PG1 are rotated with restraint due to rotation of third pinion carrier PC3 and third ring gear R3 of third planetary gearset PG3 with third sun gear S3 being kept fixed. In this state, the restraint conditions are: (a) first sun gear S1 and third ring gear R3 are kept rotating at the same speed (i.e., an input rotation speed) through fifth clutch C5 and second rotary member M2; and (b) first ring gear R1 and third pinion carrier PC3 are kept rotating at the same speed through second clutch C2 and first rotary member M1. On the basis of this rotation restraint relationship, in first planetary gearset PG1 having two inputs and one output, the rotation speed of first sun gear S1 (i.e., the input rotation speed) and the rotation speed of first ring gear R1 are determined, whereby the rotation speed of first pinion carrier PC1 is determined. The rotation outputted from first pinion carrier PC1 (that is, rotation having a speed lower than the input rotation speed and higher than the fourth speed) is transmitted to output shaft OUT without change so that the fifth speed is established.

(Sixth Speed)

Figure 9:
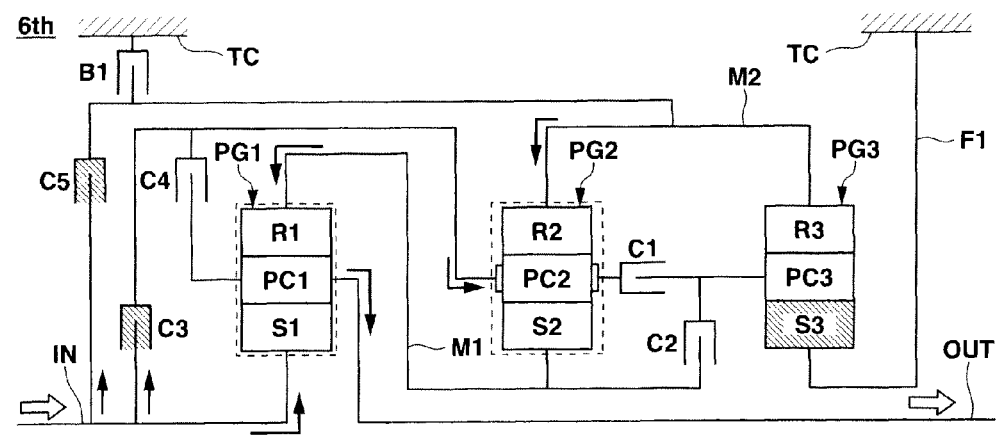
FIG. 9 is an explanatory diagram showing a shift operation at a sixth speed (6th) in the automatic transmission according to the first embodiment.

At the sixth speed (6th), third clutch C3 and fifth clutch C5 are brought into simultaneous engagement as indicated by hatching in FIG. 9.

By the simultaneous engagement of third clutch C3 and fifth clutch C5, and first, and second rotary member M1, M2, the two rotary elements S1, R1 of first planetary gearset PG1 are directly connected to each other to thereby bring the three rotary elements S1, PC1, R1 of first planetary gearset PG1 into a unitary rotation, and the two rotary elements PC2, R2 of second planetary gearset PG2 are directly connected to each other to thereby bring the three rotary elements S2, PC2, R2 of second planetary gearset PG2 into a unitary rotation. In addition, input shaft IN, first planetary gearset PG1, second planetary gearset PG2 and third ring gear R3 are directly connected to each other.

As shown in FIG. 9, when input shaft IN is rotated at a speed of rotation inputted from the drive source, first planetary gearset PG1 is brought into a unitary rotation by the input rotation. Therefore, the rotation outputted from first pinion carrier PC1 (that is, rotation having a speed equal to the input rotation speed inputted from input shaft IN) is transmitted to output shaft OUT without change, thereby establishing sixth speed (i.e., a direct connection speed) having a transmission ratio of 1.

(Seventh Speed)

Figure 10:
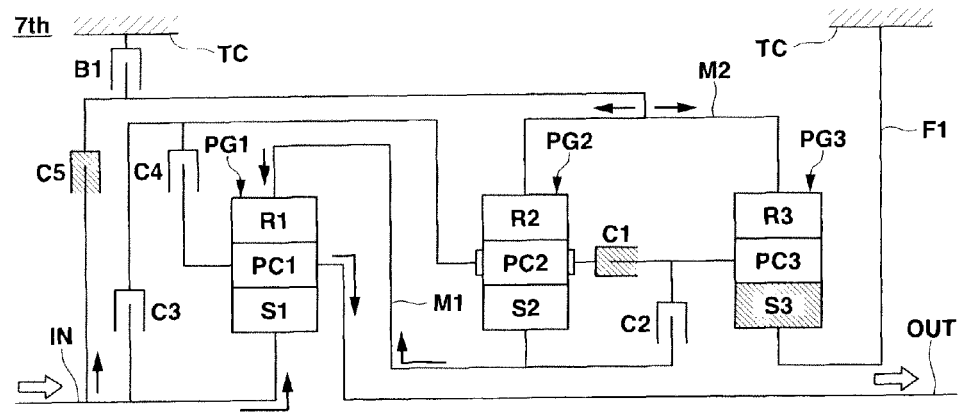
FIG. 10 is an explanatory diagram showing a shift operation at a seventh speed (7th) in the automatic transmission according to the first embodiment.

At the seventh speed (7th), first clutch C1 and fifth clutch C5 are brought into simultaneous engagement as indicated by hatching in FIG. 10.

Second pinion carrier PC2 and third pinion carrier PC3 are directly connected to each other by the engagement of first clutch C1. Input shaft IN, first sun gear S1, second ring gear R2 and third ring gear R3 are directly connected to each other by the engagement of fifth clutch C5 and second rotary member M2.

As shown in FIG. 10, when input shaft IN is rotated at a speed of rotation inputted from the drive source, second pinion carrier PC2 and second ring gear R2 of second planetary gearset PG2 are rotated with restraint due to rotation of third pinion carrier PC3 and third ring gear R3 of third planetary gearset PG3 with third sun gear S3 being kept fixed. In this state, the restraint conditions are: (a) second pinion carrier PC2 and third pinion carrier PC3 are kept rotating at the same speed (i.e., an input rotation speed) through first clutch C1; and (b) second ring gear R2 and third ring gear R3 are kept rotating at the same speed (i.e., the input rotation speed) through second rotary member M2. On the basis of this rotation restraint relationship, in second planetary gearset PG2 having two inputs and one output, the rotation speed of second pinion carrier PC2 and the rotation speed of second ring gear R2 (i.e., the input rotation speed) are determined, whereby the rotation speed of second sun gear S2 is determined. The rotation outputted from second sun gear S2 is inputted to first ring gear R1 without change through first rotary member M1. As a result, in first planetary gearset PG1 having two inputs and one output, the rotation speed of first sun gear S1 (i.e., the input rotation speed) and the rotation speed of first ring gear R1 are determined, whereby the rotation speed of first pinion carrier PC1 is determined. The rotation outputted from first pinion carrier PC1 (that is, rotation having a speed higher than the input rotation speed and the sixth speed) is transmitted to output shaft OUT without change so that the seventh speed is established.

(Eighth Speed)

Figure 11:
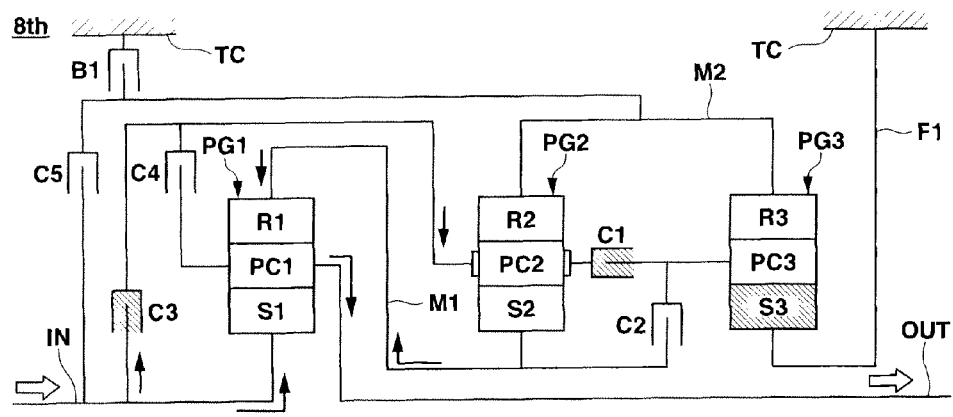
FIG. 11 is an explanatory diagram showing a shift operation at an eighth speed (8th) in the automatic transmission according to the first embodiment.

At the eighth speed (8th), first clutch C1 and third clutch C3 are brought into simultaneous engagement as indicated by hatching in FIG. 11.

Input shaft IN, first sun gear S1, second pinion carrier PC2 and third pinion carrier PC3 are directly connected to each other by the simultaneous engagement of first clutch C1 and third clutch C3.

As shown in FIG. 11, when input shaft IN is rotated at a speed of rotation inputted from the drive source, second pinion carrier PC2 and second ring gear R2 of second planetary gearset PG2 are rotated with restraint due to rotation of third pinion carrier PC3 and third ring gear R3 of third planetary gearset PG3 with third sun gear S3 being kept fixed. In this state, the restraint conditions are: (a) second pinion carrier PC2 and third pinion carrier PC3 are kept rotating at the same speed (i.e., an input rotation speed) through first clutch C1; and (b) second ring gear R2 and third ring gear R3 are kept rotating at the same speed through second rotary member M2. On the basis of this rotation restraint relationship, in second planetary gearset PG2 having two inputs and one output, the rotation speed of second pinion carrier PC2 (i.e., the input rotation speed) and the rotation speed of second ring gear R2 are determined, whereby the rotation speed of second sun gear S2 is determined. The rotation outputted from second sun gear S2 is inputted to first ring gear R1 without change through first rotary member M1. As a result, in first planetary gearset PG1 having two inputs and one output, the rotation speed of first sun gear S1 (i.e., the input rotation speed) and the rotation speed of first ring gear R1 are determined, whereby the rotation speed of first pinion carrier PC1 is determined. The rotation outputted from first pinion carrier PC1 (that is, rotation having a speed higher than the input rotation speed and the seventh speed) is transmitted to output shaft OUT without change so that the eighth speed is established.

(Reverse Speed)

Figure 12:
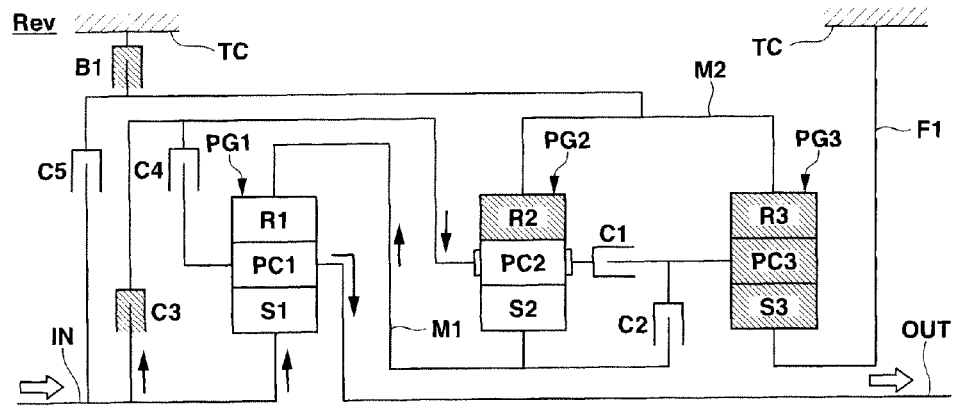
FIG. 12 is an explanatory diagram showing a shift operation at a reverse speed (Rev) in the automatic transmission according to the first embodiment.

At the reverse speed (Rev), third clutch C3 and first brake B1 are brought into simultaneous engagement as indicated by hatching in FIG. 12.

Input shaft IN, first sun gear S1 and second pinion carrier PC2 are directly connected to each other by the engagement of third clutch C3. The three rotary elements S3, PC3, R3 of third planetary gearset PG3 are unitarily fixed to transmission case TC and second ring gear R2 is fixed to transmission case TC, by the engagement of first brake B1, second rotary member M2 and first fixing member F1.

As shown in FIG. 12, when input rotation from the drive source is inputted through input shaft IN to first sun gear S1, first sun gear S1 and first ring gear R1 of first planetary gearset PG1 are rotated with restraint due to rotation of second sun gear S2 and second pinion carrier PC2 of second planetary gearset PG2 with second ring gear R2 being kept fixed. In this state, the restraint conditions are: (a) first sun gear S1 and second pinion carrier PC2 are kept rotating at the same speed (i.e., an input rotation speed) through third clutch C3; and (b) first ring gear R1 and second sun gear S2 are kept rotating at the same speed through first rotary member M1. On the basis of this rotation restraint relationship, in first planetary gearset PG1 having two inputs and one output, the rotation speed of first sun gear S1 (i.e., the input rotation speed) and the rotation speed of first ring gear R1 are determined, whereby the rotation speed of first pinion carrier PC1 is determined. The rotation outputted from first pinion carrier PC1 (that is, rotation having a speed lower than the input rotation speed which is reverse in direction to that of the input rotation) is transmitted to output shaft OUT without change so that the reverse speed is established.

Advantage of First Embodiment in Comparison to Reference Example

Figures 13, 14, 15:
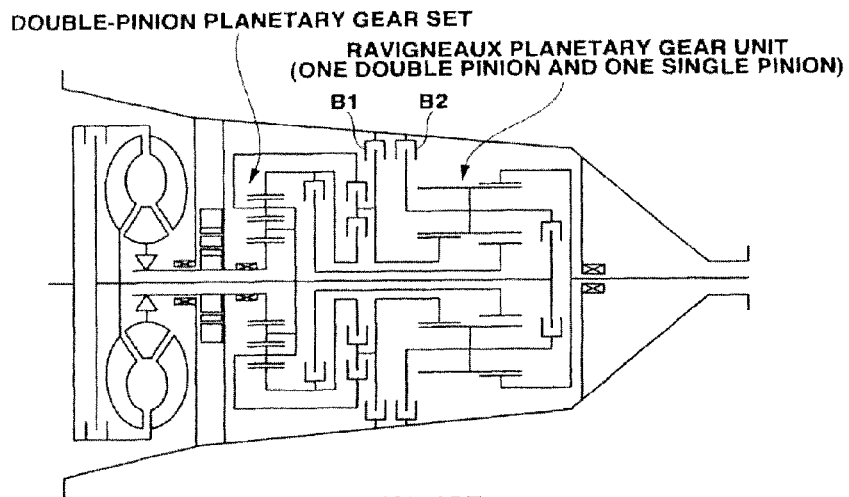
FIG. 13 is a skeleton diagram showing an automatic transmission of a reference example.
FIG. 14 is a table showing an engagement schedule of six friction elements of the automatic transmission as shown in FIG. 13 for establishing eight forward speeds and two reverse speeds by simultaneous engagement of specific two friction elements selected from the six friction elements.
FIG. 15 is a table showing the number of meshing engagement between gears at the respective eight forward speeds in the automatic transmission as shown in FIG. 13.

FIG. 13 is a skeleton diagram showing an automatic transmission of a reference example. FIG. 14 is a table showing an engagement schedule of six friction elements of the automatic transmission of the reference example for establishing eight forward speeds and two reverse speeds by simultaneous engagement of specific two friction elements selected from the six friction elements. Referring to FIG. 13 and FIG. 14, advantages of the automatic transmission according to the first embodiment in comparison to that of the reference example will be explained hereinafter.

First, in comparison to the automatic transmission of the reference example as shown in FIG. 13 and FIG. 14, the automatic transmission according to the first embodiment as shown in FIG. 1 and FIG. 2 has the same performance as that of the automatic transmission of the reference example in view of the following points.

(Basic Construction and Shift Performance)

Both the automatic transmission according to the first embodiment and the automatic transmission of the reference example establish eight forward speeds and one reverse speed by using three planetary gearsets and six friction elements.

(Shift Control Performance)

Both the automatic transmission according to the first embodiment and the automatic transmission of the reference example perform shifting from one speed to the adjacent speed and shifting from the one speed to other speed skipping the adjacent speed, by carrying out a single changeover in which one of the two friction elements to be engaged for establishing the one speed is brought into disengagement, and at the same time, one of the six friction elements except for the two friction elements which is to be engaged for establishing the adjacent speed and the other speed skipping the adjacent speed is brought into engagement.

However, the automatic transmission according to the first embodiment has advantages in view of the following points (a) to (e) as compared to the automatic transmission of the reference example.

(a) Three Planetary Gearsets

In a case where the planetary gearset for use in an automatic transmission is selected from a single-pinion planetary gearset and a double-pinion planetary gearset as options, it is considered that the single-pinion planetary gearset is preferred to the double-pinion planetary gearset in view of transmission efficiency of the gears. In addition, the planetary gearset having a small gear meshing number is preferred at the speed (or the gear stage), for instance, the first speed and the second speed, at which a relatively high gear ratio is provided and a large torque is transmitted.

As shown in FIG. 13, the automatic transmission of the reference example uses a double-pinion planetary gearset and a Ravigneaux planetary gear unit (a combination of a double-pinion planetary gearset and a single-pinion planetary gearset). That is, since the automatic transmission of the reference example uses substantially two double-pinion planetary gearsets, the following problems occur. A diameter of the respective pinion gears is reduced, resulting in deterioration in endurance reliability. The number of parts of the automatic transmission is increased, resulting in increase of the cost. In addition, since the gear meshing number is increased at the first speed and the second speed at which the gear ratio is relatively high, transmission efficiency of the gears and gear noise are deteriorated at the first speed and the second speed.

In contrast, the automatic transmission according to the first embodiment uses second planetary gearset PG2 of a double-pinion type and first and third planetary gearsets PG1 and PG3 of a single-pinion type. Therefore, the automatic transmission according to the first embodiment is reduced in number of the double-pinion planetary gearsets used in comparison to the automatic transmission of the reference example using the two double-pinion planetary gearsets. As a result, the automatic transmission according to the first embodiment has the following advantages in comparison to the automatic transmission of the reference example using the two double-pinion planetary gearsets.

In the automatic transmission according to the first embodiment, a diameter of the respective pinion gears of the single-pinion planetary gearset is increased to thereby enhance endurance reliability of the planetary gearset. Specifically, in the single-pinion planetary gearset, a plurality of pinion gears are arranged between the sun gear and the ring gear, each having a diameter equivalent to a distance between the sun gear and the ring gear. On the other hand, in the double-pinion planetary gearset, it is required that the pinion gears each should have a diameter smaller than a distance between the sun gear and the ring gear. Since the diameter of the respective pinion gears of the single-pinion planetary gearset is larger than the diameter of the respective pinion gears of the double-pinion planetary gearset, rigidity and strength of a tooth flank of the respective pinion gears can be increased so that endurance reliability of the planetary gearset can be enhanced.

In the automatic transmission according to the first embodiment, the number of parts of the planetary gearset is reduced to thereby increase cost performance. For instance, in the double-pinion planetary gearset, four pairs of pinion gears are arranged around the sun gear, so that the total number of pinion gears is eight. On the other hand, in the single-pinion planetary gearset, four pinion gears are arranged around the sun gear, so that the total number of pinion gears is four which is smaller by four than that of the double-pinion planetary gearset having the four pairs of pinion gears. As a result, it is possible to attain cost saving.

Further, in the automatic transmission according to the first embodiment, the gear meshing number at the gear stages at which the gear ratio is relatively high (that is, at the first speed and the second speed) is reduced in comparison to the automatic transmission of the reference example, resulting in enhanced gear efficiency and reduced gear noise in the automatic transmission. Specifically, in the double-pinion planetary gearset, the gear meshing number is three. On the other hand, in the single-pinion planetary gearset, no meshing engagement occurs between the pinion gears adjacent to each other, and therefore, the gear meshing number is two. Accordingly, in the automatic transmission according to the first embodiment using the one double-pinion planetary gearset and the two single-pinion planetary gearsets, as shown in FIG. 3, the gear meshing number at the first speed is five in total, and the gear meshing number at the second speed is two in total. In contrast, in the automatic transmission of the reference example using the two double-pinion planetary gearsets, as shown in FIG. 15, the gear meshing number at the first speed is six in total, and the gear meshing number at the second speed is eight in total. Accordingly, in the automatic transmission according to the first embodiment, the gear meshing number at the lower speed gear stages at which the gear ratio is relatively high and the transmission torque of the gears is large, is reduced to thereby enhance transmission efficiency of the gears and reduce gear noise at the lower speed gear stages.

(b) Gear Ratio Coverage

A range of change in gear ratio in the automatic transmission is indicated by gear ratio coverage (i.e., minimum speed gear ratio/maximum speed gear ratio) which is hereinafter simply referred to as "RC". A value of RC (hereinafter referred to as an RC value) indicates that as an RC value becomes larger, the range of change in gear ratio becomes wider. It is considered that the larger RC value is more desirable to increase a freedom of setting the gear ratio.

In the automatic transmission of the reference example, as shown in FIG. 14, the RC value of 6.397 (i.e., 4.267/0.667) is obtained. In contrast, in the automatic transmission according to the first embodiment, as shown in FIG. 2, in a case where the gear ratio $\rho1$ of first planetary gearset PG1 is set at 0.420, the gear ratio $\rho2$ of second planetary gearset PG2 is set at 0.540 and the gear ratio $\rho3$ of third planetary gearset PG3 is set at 0.473, the RC value of 7.515 (i.e., 4.915/0.654) is obtained, while keeping an appropriate value of a step ratio between the gear ratios at the adjacent speeds.

That is, in the automatic transmission according to the first embodiment, the RC value (i.e., 7.515) larger than the RC value (i.e., 6.397) in the automatic transmission of the reference example is obtained, while keeping the appropriate value of the step ratio between the gear ratio at one speed and the gear ratio at another speed adjacent to the one speed. Therefore, in the automatic transmission according to the first embodiment, it is possible to attain both a good start performance at the minimum speed gear ratio and a high speed fuel economy at the maximum speed gear ratio. Here, the "appropriate value of the step ratio between the gear ratios at the adjacent speeds" means such a condition that in a case where the step ratios between the gear ratios at the respective adjacent speeds are plotted to draw a characteristic curve thereof, the characteristic curve drops with a smooth gradient from a low gear side toward a high gear side and then levels off.

The rotation speed to be actually transmitted to the driving wheel is adjusted using a final gear ratio of final reduction gear that is disposed on a downstream side of the automatic transmission. Accordingly, as the RC value becomes larger, a freedom of adjustment by the final gear ratio can be increased. For instance, by adjusting the final gear ratio toward a lower side, application to the automatic transmission in a hybrid vehicle having no torque converter becomes advantageous. In addition, application to a gasoline engine and a diesel engine which are different in optimal fuel economy range and maximum torque range from each other becomes advantageous. That is, in a case where the automatic transmission according to the first embodiment is applied to engine vehicles, both start driving force and fuel economy (reduction of engine speed) can be satisfied.

Figures 16A, 16B, 16C, 16D:
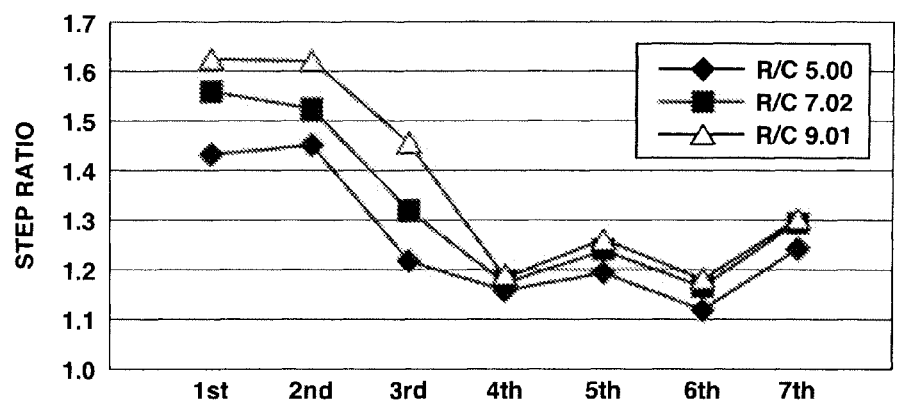
FIG. 16A to FIG. 16C are tables respectively showing gear ratios and step ratios at the respective eight forward speeds in the automatic transmission according to the first embodiment.
FIG. 16D is a graph showing the step ratios as shown in FIG. 16A to FIG. 16C.

Further, in the automatic transmission according to the first embodiment, the gear ratios at the respective speeds can be set as shown in FIG. 16A to FIG. 16C. In a case where the gear ratios at the respective speeds are set as shown in FIG. 16A, the RC value of 5.00 (i.e., 3.576/0.715) can be obtained. In a case where the gear ratios at the respective speeds are set as shown in FIG. 16B, the RC value of 7.02 (i.e., 4.631/0.660) can be obtained. In a case where the gear ratios at the respective speeds are set as shown in FIG. 16C, the RC value of 9.01 (i.e., 5.823/0.646) can be obtained. In any of these cases, it is possible to provide appropriate value of the step ratio between the gear ratios at the adjacent speeds as shown in FIG. 16D. Thus, the automatic transmission according to the first embodiment can optionally set the RC value in the range from 5 to about 9 without considerably deteriorating the step ratio between the gear ratios at the adjacent speeds. Further, since the automatic transmission according to the first embodiment has the high freedom of setting the RC value, it is possible to set appropriate RC values depending on various types and applications of vehicles and therefore further increase start driving force and fuel economy in the vehicles.

(c) Reverse Power Performance

A ratio between the first speed gear ratio and the reverse speed gear ratio determines start acceleration ability and ascent ability of the vehicle. For instance, in a case where a ratio between the first speed gear ratio and the reverse speed gear ratio is offset from about 1, there will occur a difference in driving force upon switching between the forward start and the reverse start. On the other hand, in a case where the reverse speed gear ratio is lower than the first speed gear ratio, a driving force at the reverse start will become smaller than a driving force at the forward start, resulting in deterioration in reverse start ability of the vehicle.

In the automatic transmission of the reference example, as seen from FIG. 14, the ratio Rev1/1st between the first speed gear ratio and the reverse first speed gear ratio is 0.750 and the ratio Rev2/1st between the first speed gear ratio and the reverse second speed gear ratio is 0.469. Accordingly, in the case of the ratio Rev1/1st, namely, in a case where the reverse first speed Rev1 is selected, lack of a driving force upon a reversing operation can be prevented. However, in a case where the reverse second speed Rev2 is selected, the ratio Rev2/1st between the first speed gear ratio and the reverse second speed gear ratio will be largely offset from 1 to thereby cause a difference in driving force upon the forward/reverse switching and possibility of deterioration in reverse start ability of the vehicle.

In contrast, in the automatic transmission according to the first embodiment, as seen from FIG. 2, the ratio Rev/1st between the first speed gear ratio and the reverse speed gear ratio is 0.791 which is closer to 1 than the ratio Rev1/1st in the automatic transmission of the reference example. Accordingly, in the automatic transmission according to the first embodiment, it is possible to suppress occurrence of a difference in driving force upon the forward/reverse switching and deterioration in reverse start ability of the vehicle. That is, the automatic transmission according to the first embodiment can be operated without deteriorating start acceleration ability and ascent ability of the vehicle.

(d) Unit Layout

In the automatic transmission according to the first embodiment, the gear ratio $\rho1$ of first planetary gearset PG1, the gear ratio $\rho2$ of second planetary gearset PG2 and the gear ratio $\rho3$ of third planetary gearset PG3 fall within the range of 0.3 to 0.65. Owing to the above specific ranges of the gear ratios $\rho1$, $\rho2$ and $\rho3$, it is possible to hold a strength of a tooth flank of the gears, a diameter of the respective gears and the number of teeth of the gears in the respective planetary gearsets PG1, PG2 and PG3 in appropriate ranges and suppress increase in size of the respective planetary gearsets PG1, PG2 and PG3. As a result, a unit layout for the automatic transmission can be prevented from expanding.

In addition, in the automatic transmission according to the first embodiment, torque sharing ratios of the respective friction elements (i.e., first clutch C1 to first brake B1) are not more than 4.0 in the forward operation and are not more than 6.0 in the reverse operation. Owing to the above specific ranges of the torque sharing ratios, the respective friction elements (i.e., first clutch C1 to first brake B1) can be prevented from upsizing, thereby suppressing expansion of unit layout for the automatic transmission.

Further, by suppressing the expansion of unit layout, it is possible to make transmission case TC compact and thereby greatly serve for reducing a unit size, a unit weight and a cost of the automatic transmission.

(e) Automatic Transmission Unit Shape

Among the friction elements including clutch elements and brake elements, each brake element is disposed between a rotary element and a transmission case of the automatic transmission. In a case where the torque sharing ratio of the brake element is high, it is necessary to increase the number of brake plates of the brake element and increase a diameter of the transmission case.

In the automatic transmission of the reference example, second brake B2 is a brake element having a maximum torque sharing ratio and is disposed between the double-pinion planetary gearset and the Ravigneaux planetary gear unit as shown in FIG. 13. In order to avoid interference between the transmission case accommodating second brake B2 and a vehicle floor which will be caused due to the arrangement of second brake B2, it is necessary to form a floor tunnel extending toward an inside of a vehicle compartment to a large extent.

In contrast, in the automatic transmission according to the first embodiment, first brake B1 is a brake element having a maximum torque sharing ratio and is disposed on a front side of first planetary gearset PG1 as shown in FIG. 1, that is, in an upstream position of first planetary gearset PG1 and on a side of the drive source, where first brake B1 is free from interfering with a vehicle floor. With this arrangement, it is possible to reduce a diameter of a region of transmission case TC which overlaps with the vehicle floor. Therefore, by increasing a diameter of only a front portion of transmission case TC which is disposed in a power unit room (for instance, an engine room), a portion of transmission case TC which rearward extends from the front portion can be shaped so as to have a reduced diameter. For instance, merely by forming a floor tunnel which slightly projects into a vehicle compartment, transmission case TC can be prevented from interfering with the vehicle floor.

The automatic transmission according to the first embodiment has the following functions and effects.

(1) The automatic transmission according to the first embodiment includes: first planetary gearset PG1 including first sun gear S1, first ring gear R1 and first pinion carrier PC1 as a single-pinion carrier which supports first pinion gear P1 meshing with first sun gear S1 and first ring gear R1; second planetary gearset PG2 including second sun gear S2, second ring gear R2 and second pinion carrier PC2 as a double-pinion carrier which supports second pinion gears P2$s$, P2$r$, one P2$s$ of the second pinion gears meshing with second sun gear S2, the other P2$r$ of the second pinion gears meshing with second ring gear R2; third planetary gearset PG3 including third sun gear S3, third ring gear R3 and third pinion carrier PC3 as a single-pinion carrier which supports third pinion gear P3 meshing with third sun gear S3 and third ring gear R3; input shaft IN; output shaft OUT; and six friction elements, the automatic transmission being capable of shifting a gear stage to at least eight forward speeds by appropriately engaging and disengaging the six friction elements to thereby output a torque from input shaft IN to output shaft OUT, wherein input shaft IN is always connected to first sun gear S1; output shaft OUT is always connected to first pinion carrier PC1; third sun gear S3 is always kept in a fixed state relative to transmission case TC of the automatic transmission to constitute a first fixing member; first ring gear R1 and second sun gear S2 are always connected to each other and constitute first rotary member N1; second ring gear R2 and third ring gear R3 are always connected to each other to constitute second rotary member M2; the six friction elements are constituted of a first friction element (i.e., first clutch C1) which selectively connects second pinion carrier PC2 and third pinion carrier PC3, a second friction element (i.e., second clutch C2) which selectively connects third pinion carrier PC3 and first rotary member M third friction element (i.e., third clutch C3) which selectively connects first sun gear S1 and second pinion carrier PC2, a fourth friction element (i.e., fourth clutch C4) which selectively connects first pinion carrier PC1 and second pinion carrier PC2, a fifth friction element (i.e., fifth clutch C5) which selectively connects first sun gear S1 and second rotary member M2, and a sixth friction element (i.e., first brake B1) which is capable of interrupting rotation of second rotary member M2; and the at least eight forward speeds and one reverse speed are respectively established by simultaneous engagement of two friction elements selected from the six friction elements.

With this construction, the automatic transmission according to the first embodiment can establish the eight forward speeds by using the three planetary gearsets and the six friction elements, while being reduced in number of the double-pinion planetary gearsets to be used therein. As a result, the automatic transmission according to the first embodiment can have advantages of enhancing endurance reliability and cost performance. Further, since the automatic transmission according to the first embodiment can establish multiple speeds without increasing the number of planetary gear sets to be used and the number of friction elements to be used, the automatic transmission according to the first embodiment can enhance fuel economy performance and shift performance without expansion of unit layout and increase in cost. In addition, the automatic transmission according to the first embodiment can have advantages of enhancing gear efficiency and reducing gear noise at the speeds at which the gear ratio is high.

(2) In the automatic transmission according to the first embodiment, the at least eight forward speeds which are respectively established by simultaneous engagement of two friction elements of the six friction elements include a first speed which is established by simultaneous engagement of the fourth friction element (i.e., fourth clutch C4) and the sixth friction element (i.e., first brake B1), a second speed which is established by simultaneous engagement of the second friction element (i.e., second clutch C2) and the sixth friction element (i.e., first brake B1), a third speed which is established by simultaneous engagement of the second friction element (i.e., second clutch C2) and the fourth friction element (i.e., fourth clutch C4), a fourth speed which is established by simultaneous engagement of the second friction element (i.e., second clutch C2) and the third friction element (i.e., third clutch C3), a fifth speed which is established by simultaneous engagement of the second friction element (i.e., second clutch C2) and the fifth friction element (i.e., fifth clutch C5), a sixth speed which is established by simultaneous engagement of the third friction element (i.e., third clutch C3) and the fifth friction element (i.e., fifth clutch C5), a seventh speed which is established by simultaneous engagement of the first friction element (i.e., first clutch C1) and the fifth friction element (i.e., fifth clutch C5), and an eighth speed which is established by simultaneous engagement of the first friction element (i.e., first clutch C1) and the third friction element (i.e., third clutch C3).

With this construction, the automatic transmission according to the first embodiment can have an advantage of attaining shifting from one speed to the adjacent speed and shifting from the one speed to the other speed skipping the adjacent speed, by carrying out a single changeover in which one of the two friction elements to be engaged for establishing the one speed is brought into disengagement, and at the same time, one of the six friction elements except for the two friction elements which is to be engaged for establishing the adjacent speed and the other speed skipping the adjacent speed is brought into engagement. Therefore, the automatic transmission according to the first embodiment can have an advantage of simplifying the shift control. In addition, in the automatic transmission according to the first embodiment, while keeping an appropriate step ratio, it is possible to set the RC value to a required value that is needed to satisfy both start performance at the minimum speed gear ratio and high speed fuel economy at the maximum speed gear ratio. Further, the RC value can be selected without extremely disturbing the step ratio.

(3) In the automatic transmission according to the first embodiment, the one reverse speed is established by simultaneous engagement of the third friction element (i.e., third clutch C3) and the sixth friction element (i.e., first brake B1). With this construction, even in a case where such a gear ratio as to achieve an appropriate RC value and an appropriate step ratio is selected, an evaluation value of the reverse gear ratio (that is, reverse gear ratio/first speed gear ratio) can be set near about 1. As a result, it is possible to suppress occurrence of a difference in driving force upon shifting between the forward operation and the reverse operation and ensure reverse start acceleration ability and ascent ability of the vehicle.

(4) In the automatic transmission according to the first embodiment, first planetary gearset PG1, second planetary gearset PG2 and third planetary gearset PG3 are arranged in this order in a direction extending from input shaft IN to be connected with the drive source toward output shaft OUT, and the sixth friction element (i.e., first brake B1) is disposed in an upstream position of first planetary gearset PG1 on the side of the drive source. With this construction, only a diameter of a front portion of transmission case TC must be increased and a diameter of the following portion of transmission case TC which extends from the front portion can be reduced. This configuration of transmission case TC serves for suppressing interference of transmission case TC with a vehicle floor and reducing an amount of projection of a floor tunnel into a vehicle compartment.

Second Embodiment

Next, a second embodiment of the present invention is explained. The second embodiment differs from the first embodiment only in that the first planetary gearset and the third planetary gearset are changed in position from each other, but has the same shift performance as that of the first embodiment.

Figure 17:
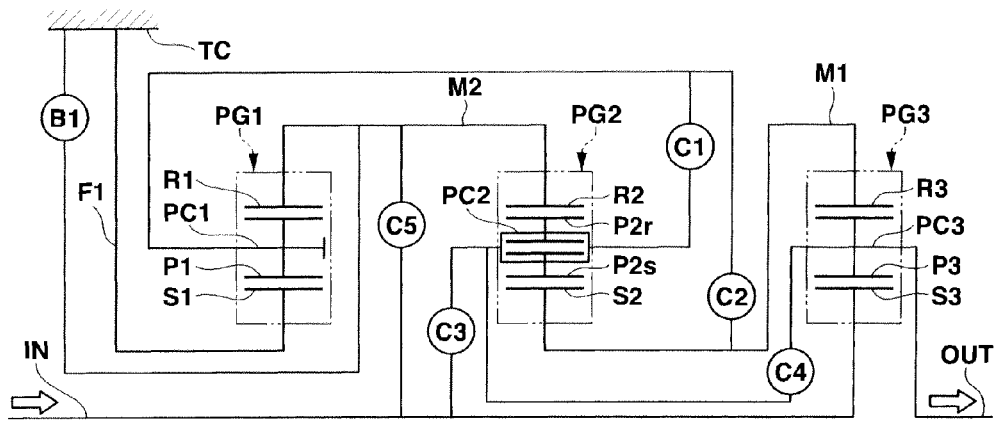
FIG. 17 is a skeleton diagram showing an automatic transmission according to a second embodiment of the present invention.

FIG. 17 is a skeleton diagram showing an automatic transmission according to the second embodiment of the present invention. Planetary gearsets and friction elements of the automatic transmission according to the second embodiment are explained by referring to FIG. 17.

As shown in FIG. 17, the automatic transmission according to the second embodiment includes input shaft IN, output shaft OUT, first planetary gearset PG1, second planetary gearset PG2, third planetary gearset PG3, first fixing member F1, first rotary member M1, second rotary member M2, first clutch C1 (i.e., a first friction element), second clutch C2 (i.e., a second friction element), third clutch C3 (i.e., a third friction element), fourth clutch C4 (i.e., a fourth friction element), fifth clutch C5 (i.e., a fifth friction element), first brake B1 (i.e., six friction element) and transmission case TC.

First planetary gearset PG1 is a single-pinion planetary gearset including first sun gear S1, first pinion carrier PC1 as a single-pinion carrier which supports first pinion gear P1, and first ring gear R1. First pinion gear P1 is in meshing engagement with first sun gear S1. First ring gear R1 is in meshing engagement with first pinion gear P1.

Second planetary gearset PG2 is a double-pinion planetary gearset including second sun gear S2, second pinion carrier PC2 as a double-pinion carrier which supports second pinion gears P2s and P2r, and second ring gear R2. Pinion gear P2s is in meshing engagement with second sun gear S2. Pinion gear P2r is in meshing engagement with pinion gear P2s and second ring gear R2.

Third planetary gearset PG3 is a single-pinion planetary gearset including third sun gear S3, third pinion carrier PC3 as a single-pinion carrier which supports third pinion gear P3, and third ring gear R3. Third pinion gear P3 is in meshing engagement with third sun gear S3. Third ring gear R3 is in meshing engagement with third pinion gear P3.

Input shaft IN receives a driving torque that is transmitted from a drive source such as an engine via a torque converter and the like. Input shaft IN is always connected to third sun gear S3.

Output shaft OUT outputs a driving torque after shifting to a driving wheel through a propeller shaft, a final gear and the like. Output shaft OUT is always connected to third pinion carrier PC3.

First fixing member F1 always fixes first sun gear S1 to transmission case TC. First fixing member F1 is disposed in an upstream position of first planetary gearset PG1 on the side of the drive source.

First rotary member M1 is a rotary member which always connects second sun gear S2 and third ring gear R3 to each other without intervention of a friction element.

Second rotary member M2 is a rotary member which always connects first ring gear R1 and second ring gear R2 to each other without intervention of a friction element.

First clutch C1 is a first friction element which selectively connects first pinion carrier PC1 and second pinion carrier PC2.

Second clutch C2 is a second friction element which selectively connects first pinion carrier PC1 and first rotary member M1.

Third clutch C3 is a third friction element which selectively connects second pinion carrier PC2 and third sun gear S3.

Fourth clutch C4 is a fourth friction element which selectively connects second pinion carrier PC2 and third pinion carrier PC3.

Fifth clutch C5 is a fifth friction element which selectively connects third sun gear S3 and second rotary member M2.

First brake B1 is a sixth friction element which is operative to interrupt rotation of second rotary member M2 relative to transmission case TC. First brake B1 is disposed in an upstream position of first planetary gearset PG1 on the side of the drive source.

First planetary gearset PG1, second planetary gearset PG2 and third planetary gearset PG3 are arranged in this order in a direction extending from input shaft IN to be connected with the drive source toward output shaft OUT as shown in FIG. 17.

The automatic transmission according to the second embodiment has the same shift construction to establish the respective speeds as that of the automatic transmission according to the first embodiment as shown in FIG. 2 and FIG. 3, and therefore, detailed explanations therefor are omitted.

An operation of the automatic transmission according to the second embodiment will be explained hereinafter with respect to "a shift operation at the respective speeds" and "an advantage in comparison to a reference example".

[Shift Operation at Respective Speeds]

Referring to FIG. 18 to FIG. 26, the shift operation at the respective speeds is explained.

(First Speed)

Figure 18:
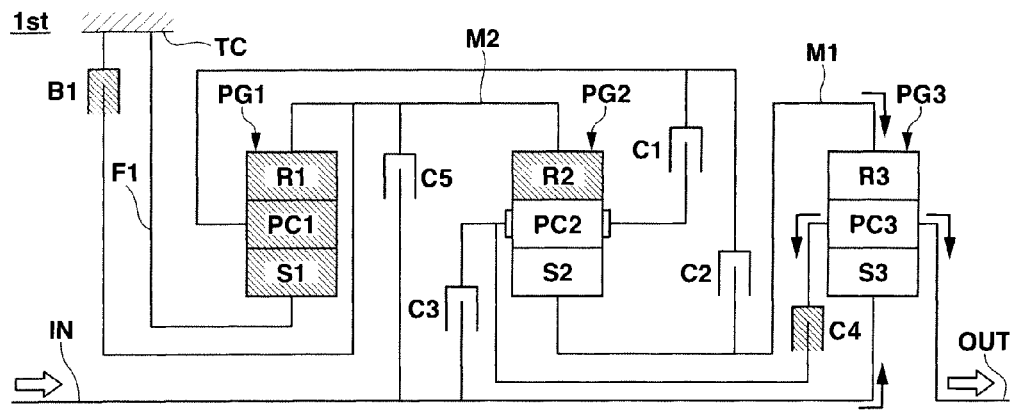
FIG. 18 is an explanatory diagram showing a shift operation at a first speed (1st) in the automatic transmission according to the second embodiment.

At the first speed (1st), fourth clutch C4 and first brake B1 are brought into simultaneous engagement as indicated by hatching in FIG. 18.

Second pinion carrier PC2 and third pinion carrier PC3 are directly connected to each other by the engagement of fourth clutch C4. The three rotary elements S1, PC1, R1 of first planetary gearset PG1 are unitarily fixed to transmission case TC and second ring gear R2 is fixed to transmission case TC, by the engagement of first brake B1, second rotary member M2 and first fixing member F1.

As shown in FIG. 18, when input rotation from the drive source is inputted through input shaft IN to third sun gear S3, third pinion carrier PC3 and third ring gear R3 of third planetary gearset PG3 are rotated with restraint due to rotation of second sun gear S2 and second pinion carrier PC2 of second planetary gearset PG2 with second ring gear R2 being kept fixed. In this state, the restraint conditions are: (a) second pinion carrier PC2 and third pinion carrier PC3 are kept rotating at the same speed through fourth clutch C4; and (b) second sun gear S2 and third ring gear R3 are kept rotating at the same speed through first rotary member M1. On the basis of this rotation restraint relationship, the rotation speed of third pinion carrier PC3 becomes a reduced input rotation speed. The rotation outputted from third pinion carrier PC3 (that is, rotation having a speed lower than the input rotation speed) is transmitted to output shaft OUT without change so that the first speed is established.

(Second Speed)

Figure 19:
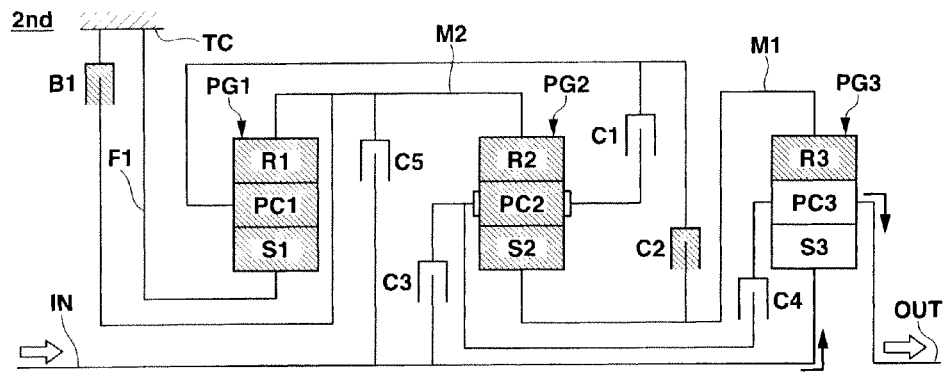
FIG. 19 is an explanatory diagram showing a shift operation at a second speed (2nd) in the automatic transmission according to the second embodiment.

At the second speed (2nd), second clutch C2 and first brake B1 are brought into simultaneous engagement as indicated by hatching in FIG. 19.

The three rotary elements S1, PC1, R1 of first planetary gearset PG1 are unitarily fixed to transmission case TC, three rotary elements S2, PC2, R2 of second planetary gearset PG2 are unitarily fixed to transmission case TC, and third ring gear R3 is fixed to transmission case TC, by the simultaneous engagement of second clutch C2 and first brake B1 and by first and second rotary members M1, M2 and first fixing member F1.

As shown in FIG. 19, when input rotation from the drive source is inputted through input shaft IN to third sun gear S3, third planetary gearset PG3 with third ring gear R3 being kept fixed is operated to reduce the input rotation speed and output the rotation having a reduced speed from third pinion carrier PC3. The rotation outputted from third pinion carrier PC3 (that is, rotation having a speed lower than the input rotation speed and higher than the first speed) is transmitted to output shaft OUT without change so that the second speed is established.

(Third Speed)

Figure 20:
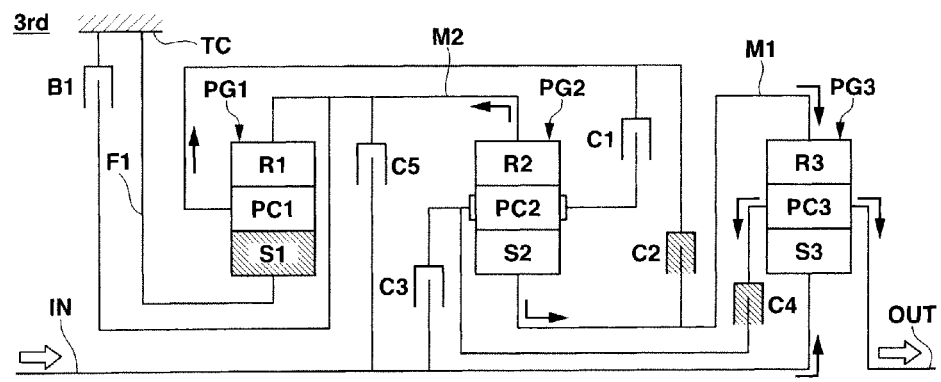
FIG. 20 is an explanatory diagram showing a shift operation at a third speed (3rd) in the automatic transmission according to the second embodiment.

At the third speed (3rd), second clutch C2 and fourth clutch C4 are brought into simultaneous engagement as indicated by hatching in FIG. 20.

First pinion carrier PC1, second sun gear S2 and third ring gear R3 are directly connected to each other by the engagement of second clutch C2 and first rotary member M1. Second pinion carrier PC2 and third pinion carrier PC3 are directly connected to each other by the engagement of fourth clutch C4.

As shown in FIG. 20, when input rotation from the drive source is inputted through input shaft IN to third sun gear S3, third pinion carrier PC3 and third ring gear R3 of third planetary gearset PG3 are rotated with restraint due to rotation of second sun gear S2 and second pinion carrier PC2 of second planetary gearset PG2. Second sun gear S2 and second ring gear R2 of second planetary gearset PG2 are rotated with restraint due to rotation of first pinion carrier PC1 and first ring gear R1 of first planetary gearset PG1 with first sun gear S1 being kept fixed. In this state, the restraint conditions are: (a) first pinion carrier PC1, second sun gear 52 and third ring gear R3 are kept rotating at the same speed through second clutch C2 and first rotary member M1; (b) second pinion carrier PC2 and third pinion carrier PC3 are kept rotating at the same speed through fourth clutch C4; and (c) first ring gear R1 and second ring gear R2 are kept rotating at the same speed through second rotary member M2. On the basis of this rotation restraint relationship, the rotation speed of third pinion carrier PC3 becomes a reduced input rotation speed. The rotation outputted from third pinion carrier PC3 (that is, rotation having a speed lower than the input rotation speed and higher than the second speed) is transmitted to output shaft OUT without change so that the third speed is established.

(Fourth Speed)

Figure 21:
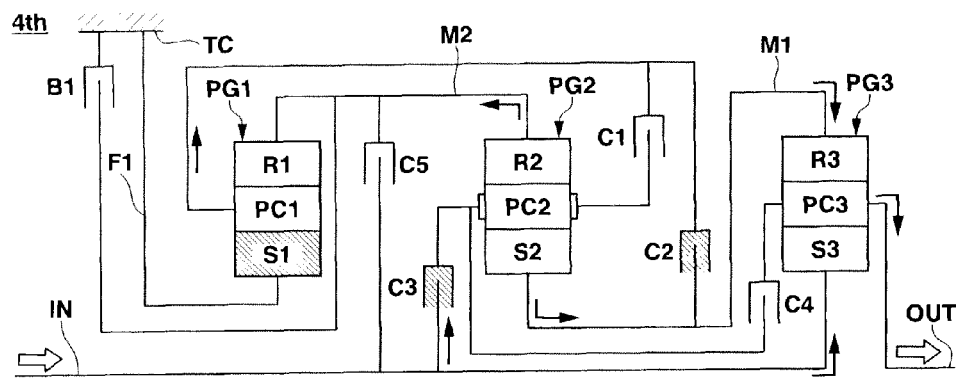
FIG. 21 is an explanatory diagram showing a shift operation at a fourth speed (4th) in the automatic transmission according to the second embodiment.

At the fourth speed (4th), second clutch C2 and third clutch C3 are brought into simultaneous engagement as indicated by hatching in FIG. 21.

First pinion carrier PC1, second sun gear S2 and third ring gear R3 are directly connected to each other by the engagement of second clutch C2 and first rotary member M1. Input shaft IN, second pinion carrier PC2 and third sun gear S3 are directly connected to each other by the engagement of third clutch C3.

As shown in FIG. 21, when input shaft IN is rotated at a speed of rotation inputted from the drive source, second sun gear S2 and second ring gear R2 of second planetary gearset PG2 are rotated with restraint due to rotation of first pinion carrier PC1 and first ring gear R1 of first planetary gearset PG1 with first sun gear S1 being kept fixed. In this state, the restraint conditions are: (a) first pinion carrier PC1 and second sun gear S2 are kept rotating at the same speed through second clutch C2 and first rotary member M1; and (b) first ring gear R1 and second ring gear R2 are kept rotating at the same speed through second rotary member M2. On the basis of this rotation restraint relationship, the rotation speed of first pinion carrier PC1 and second sun gear S2 is determined, and the rotation speed thus determined is inputted to third ring gear R3 through first rotary member M1 without change. As a result, in third planetary gearset PG3 having two inputs and one output, the rotation speed of third sun gear S3 (i.e., the input rotation speed) and the rotation speed of third ring gear R3 are determined, whereby the rotation speed of third pinion carrier PC3 is determined. The rotation outputted from third pinion carrier PC3 (that is, rotation having a speed lower than the input rotation speed and higher than the third speed) is transmitted to output shaft OUT without change so that the fourth speed is established.

(Fifth Speed)

Figure 22:
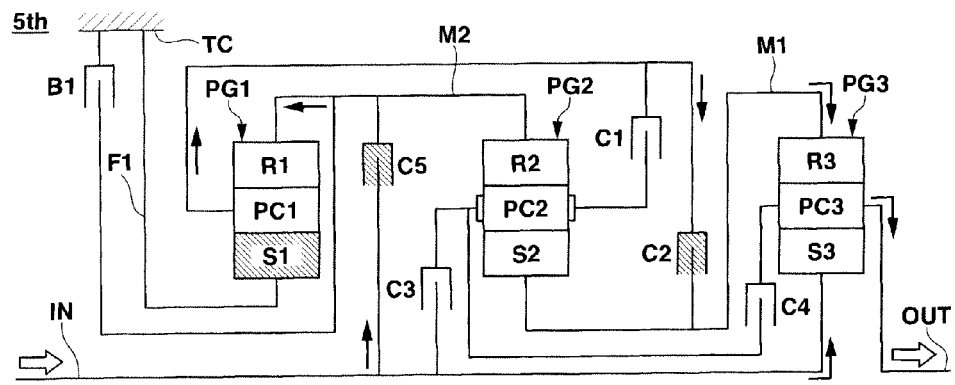
FIG. 22 is an explanatory diagram showing a shift operation at a fifth speed (5th) in the automatic transmission according to the second embodiment.

At the fifth speed (5th), second clutch C2 and fifth clutch C5 are brought into simultaneous engagement as indicated by hatching in FIG. 22.

First pinion carrier PC1, second sun gear S2 and third ring gear R3 are directly connected to each other by the engagement of second clutch C2 and first rotary member M1. Input shaft IN, first ring gear R1, second ring gear R2 and third sun gear S3 are directly connected to each other by the engagement of fifth clutch C5 and second rotary member M2.

As shown in FIG. 22, when input shaft IN is rotated at a speed of rotation inputted from the drive source, third sun gear S3 and third ring gear R3 of third planetary gearset PG3 are rotated with restraint due to rotation of first pinion carrier PC1 and first ring gear R1 of first planetary gearset PG1 with first sun gear S1 being kept fixed. In this state, the restraint conditions are: (a) first ring gear R1 and third sun gear S3 are kept rotating at the same speed (i.e., an input rotation speed) through fifth clutch C5 and second rotary member M2; and (b) first pinion carrier PC1 and third ring gear R3 are kept rotating at the same speed through second clutch C2 and first rotary member M1. On the basis of this rotation restraint relationship, in third planetary gearset PG3 having two inputs and one output, the rotation speed of third sun gear S3 (i.e., the input rotation speed) and the rotation speed of third ring gear R3 are determined, whereby the rotation speed of third pinion carrier PC3 is determined. The rotation outputted from third pinion carrier PC3 (that is, rotation having a speed lower than the input rotation speed and higher than the fourth speed) is transmitted to output shaft OUT without change so that the fifth speed is established.

(Sixth Speed)

Figure 23:
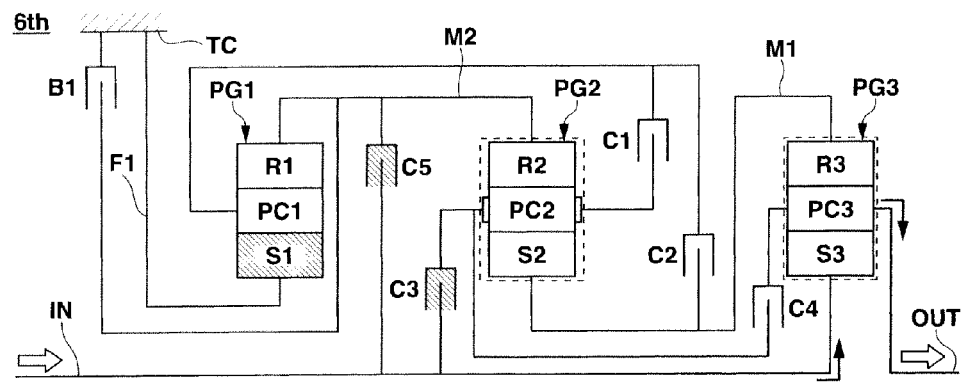
FIG. 23 is an explanatory diagram showing a shift operation at a sixth speed (6th) in the automatic transmission according to the second embodiment.

At the sixth speed (6th), third clutch C3 and fifth clutch C5 are brought into simultaneous engagement as indicated by hatching in FIG. 23.

By the simultaneous engagement of third clutch C3 and fifth clutch C5 and first, and second rotary members M1, M2, the two rotary elements PC2, R2 of second planetary gearset PG2 are directly connected to each other to thereby bring the three rotary elements S2, PC2, R2 of second planetary gearset PG2 into a unitary rotation, and the two rotary elements S3, R3 of third planetary gearset PG3 are directly connected to each other to thereby bring the three rotary elements S3, PC3, R3 of third planetary gearset PG3 into a unitary rotation. In addition, input shaft IN, first ring gear R1, second planetary gearset PG2 and third planetary gearset PG3 are directly connected to each other.

As shown in FIG. 23, when input shaft IN is rotated at a speed of rotation inputted from the drive source, third planetary gearset PG3 is brought into a unitary rotation by the input rotation. Therefore, the rotation outputted from third pinion carrier PC3 (that is, rotation having a speed equal to the input rotation speed inputted from input shaft IN) is transmitted to output shaft OUT without change, thereby establishing sixth speed (i.e., a direct connection speed) having a transmission ratio of 1.

(Seventh Speed)

Figure 24:
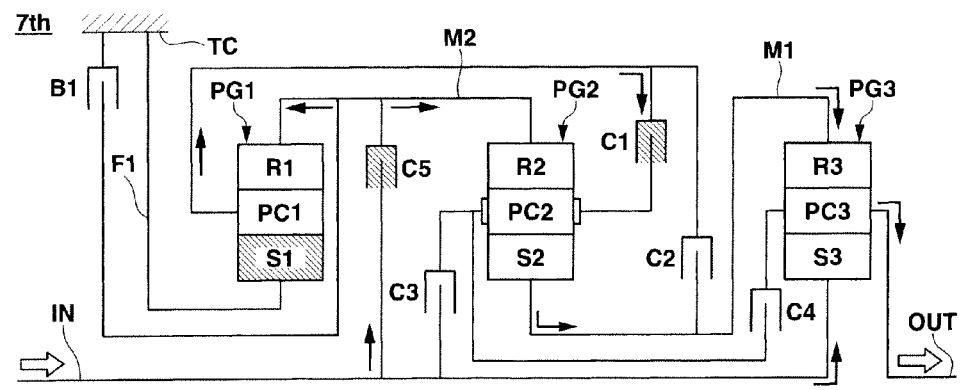
FIG. 24 is an explanatory diagram showing a shift operation at a seventh speed (7th) in the automatic transmission according to the second embodiment.

At the seventh speed (7th), first clutch C1 and fifth clutch C5 are brought into simultaneous engagement as indicated by hatching in FIG. 24.

First pinion carrier PC1 and second pinion carrier PC2 are directly connected to each other by the engagement of first clutch C1. Input shaft IN, first ring gear R1, second ring gear R2 and third sun gear S3 are directly connected to each other by the engagement of fifth clutch C5 and second rotary member M2.

As shown in FIG. 24, when input shaft IN is rotated at a speed of rotation inputted from the drive source, second pinion carrier PC2 and second ring gear R2 of second planetary gearset PG2 are rotated with restraint due to rotation of first pinion carrier PC1 and first ring gear R1 of first planetary gearset PG1 with first sun gear S1 being kept fixed. In this state, the restraint conditions are: (a) first pinion carrier PC1 and second pinion carrier PC2 are kept rotating at the same speed through first clutch C1; and (b) first ring gear R1 and second ring gear R2 are kept rotating at the same speed (i.e., an input rotation speed) through fifth clutch C5 and second rotary member M2. On the basis of this rotation restraint relationship, in second planetary gearset PG2 having two inputs and one output, the rotation speed of second pinion carrier PC2 and the rotation speed of second ring gear R2 (i.e., the input rotation speed) are determined, whereby the rotation speed of second sun gear S2 is determined. The rotation outputted from second sun gear S2 is inputted to third ring gear R3 without change through first rotary member M1. As a result, in third planetary gearset PG3 having two inputs and one output, the rotation speed of third sun gear S3 (i.e., the input rotation speed) and the rotation speed of third ring gear R3 are determined, whereby the rotation speed of third pinion carrier PC3 is determined. The rotation outputted from third pinion carrier PC3 (that is, rotation having a speed higher than the input rotation speed and the sixth speed) is transmitted to output shaft OUT without change so that the seventh speed is established.

(Eighth Speed)

Figure 25:
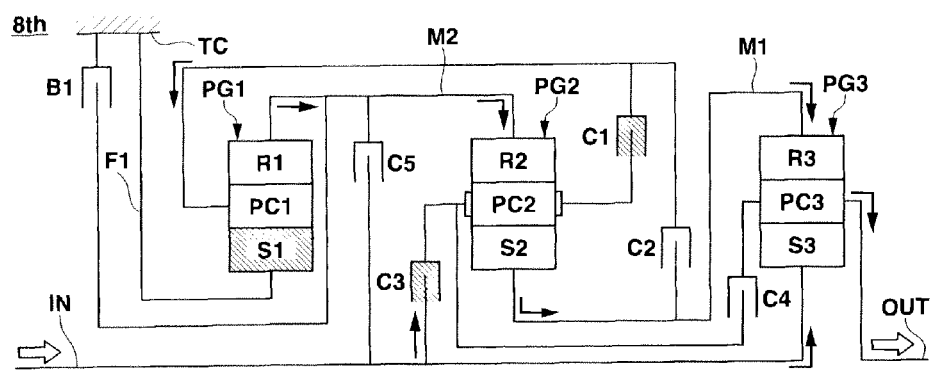
FIG. 25 is an explanatory diagram showing a shift operation at an eighth speed (8th) in the automatic transmission according to the second embodiment.

At the eighth speed (8th), first clutch C1 and third clutch C3 are brought into simultaneous engagement as indicated by hatching in FIG. 25.

Input shaft IN, first pinion carrier PC1, second pinion carrier PC2 and third sun gear S3 are directly connected to each other by the simultaneous engagement of first clutch C1 and third clutch C3.

As shown in FIG. 25, when input shaft IN is rotated at a speed of rotation inputted from the drive source, second pinion carrier PC2 and second ring gear R2 of second planetary gearset PG2 are rotated with restraint due to rotation of first pinion carrier PC1 and first ring gear R1 of first planetary gearset PG1 with first sun gear S1 being kept fixed. In this state, the restraint conditions are: (a) first pinion carrier PC1 and second pinion carrier PC2 are kept rotating at the same speed (i.e., an input rotation speed) through first clutch C1; and (b) first ring gear R1 and second ring gear R2 are kept rotating at the same speed through second rotary member M2. On the basis of this rotation restraint relationship, in second planetary gearset PG2 having two inputs and one output, the rotation speed of second pinion carrier PC2 (i.e., the input rotation speed) and the rotation speed of second ring gear R2 are determined, whereby the rotation speed of second sun gear S2 is determined. The rotation outputted from second sun gear S2 is inputted to third ring gear R3 without change through first rotary member M1. As a result, in third planetary gearset PG3 having two inputs and one output, the rotation speed of third sun gear S3 (i.e., the input rotation speed) and the rotation speed of third ring gear R3 are determined, whereby the rotation speed of third pinion carrier PC3 is determined. The rotation outputted from third pinion carrier PC3 (that is, rotation having a speed higher than the input rotation speed and the seventh speed) is transmitted to output shaft OUT without change so that the eighth speed is established.

(Reverse Speed)

Figure 26:
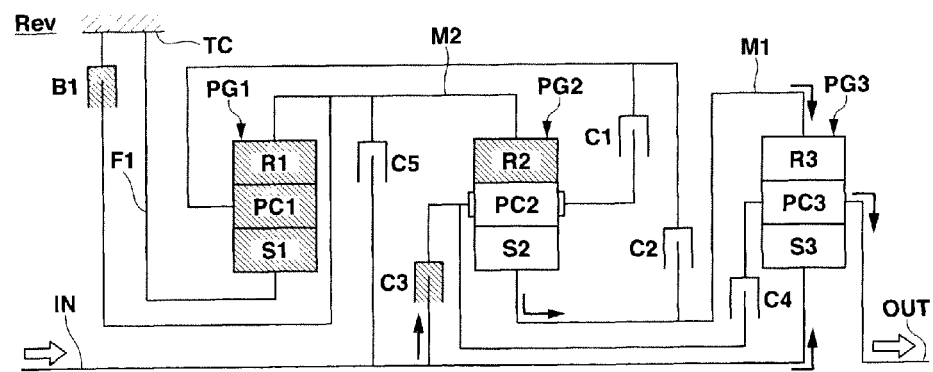
FIG. 26 is an explanatory diagram showing a shift operation at a reverse speed (Rev) in the automatic transmission according to the second embodiment.

At the reverse speed (Rev), third clutch C3 and first brake B1 are brought into simultaneous engagement as indicated by hatching in FIG. 26.

Input shaft IN, second pinion carrier PC2 and third sun gear S3 are directly connected to each other by the engagement of third clutch C3. The three rotary elements S1, PC1, R1 of first planetary gearset PG1 are unitarily fixed to transmission case TC and second ring gear R2 is fixed to transmission case TC, by the engagement of first brake B1, second rotary member M2 and first fixing member F1.

As shown in FIG. 26, when input rotation from the drive source is inputted through input shaft IN to third sun gear S3, third sun gear S3 and third ring gear R3 of third planetary gearset PG3 are rotated with restraint due to rotation of second sun gear S2 and second pinion carrier PC2 of second planetary gearset PG2 with second ring gear R2 being kept fixed. In this state, the restraint conditions are: (a) second pinion carrier PC2 and third sun gear S3 are kept rotating at the same speed (i.e., an input rotation speed) through third clutch C3; and (b) second sun gear S2 and third ring gear R3 are kept rotating at the same speed through first rotary member M1. On the basis of this rotation restraint relationship, in third planetary gearset PG3 having two inputs and one output, the rotation speed of third sun gear S3 (i.e., the input rotation speed) and the rotation speed of third ring gear R3 are determined, whereby the rotation speed of third pinion carrier PC3 is determined. The rotation outputted from third pinion carrier PC3 (that is, rotation having a speed lower than the input rotation speed which is reverse in direction to that of the input rotation) is transmitted to output shaft OUT without change so that the reverse speed is established.

Advantage of Second Embodiment in Comparison to Reference Example

In comparison to the automatic transmission of the reference example as shown in FIG. 13, similarly to the automatic transmission according to the first embodiment, the automatic transmission according to the second embodiment as shown in FIG. 17 is equivalent to the automatic transmission of the reference example in view of basic construction, shift performance and shift control performance.

However, the automatic transmission according to the second embodiment has the following advantage in view of three planetary gearsets, as compared to the automatic transmission of the reference example.

The automatic transmission according to the second embodiment uses a double-pinion planetary gearset only for second planetary gearset PG2 and respective single-pinion planetary gearsets for first planetary gearset PG1 and third planetary gearset PG3. Since the double-pinion planetary gearset used in the automatic transmission according to the second embodiment is only one, the automatic transmission according to the second embodiment is more advantageous than the automatic transmission of the reference example in view of pinion diameter, number of parts and gear meshing number at lower speed gear stages at which the gear ratio is relatively high and the transmission torque is high.

As a result, the automatic transmission according to the second embodiment can attain eight forward speeds using three planetary gearsets and six friction elements and can also be enhanced in endurance reliability and cost performance and further can attain increased gear efficiency and reduction of gear noise at the lower speed gear stages.

Further, in the automatic transmission according to the second embodiment, first fixing member F1 and first brake B1 are disposed in an upstream position of first planetary gearset PG1 on the side of the drive source. That is, a plurality of brake elements can be collectively arranged on a front side of transmission case TC, thereby achieving downsizing of transmission case TC and further reducing occurrence of interference thereof with the vehicle floor.

The automatic transmission according to the second embodiment can attain the following function and effect (5) in addition to the functions and effects (1) to (4) of the automatic transmission according to the first embodiment.

(5) The automatic transmission according to the second embodiment includes: first planetary gearset PG1 including first sun gear S1, first ring gear R1 and first pinion carrier PC1 as a single-pinion carrier which supports first pinion gear P1 meshing with first sun gear S1 and first ring gear R1; second planetary gearset PG2 including second sun gear S2, second ring gear R2 and second pinion carrier PC2 as a double-pinion carrier which supports second pinion gears P2s and P2r, one P2s of the second pinion gears meshing with second sun gear S2, the other P2r of the second pinion gears meshing with second ring gear R2; third planetary gearset PG3 including third sun gear S3, third ring gear R3 and third pinion carrier PC3 as a single-pinion carrier which supports third pinion gear P3 meshing with third sun gear S3 and third ring gear R3; input shaft IN; output shaft OUT; and six friction elements, the automatic transmission being capable of shifting a gear stage to at least eight forward speeds by appropriately engaging and disengaging the six friction elements to thereby output a torque from input shaft IN to output shaft OUT, wherein input shaft IN is always connected to third sun gear S3; output shaft OUT is always connected to third pinion carrier PC3; first sun gear S1 is always kept in a fixed state relative to transmission case TC of the automatic transmission to constitute first fixing member F1; second sun gear S2 and third ring gear R3 are always connected to each other to constitute first rotary member M1; first ring gear R1 and second ring gear R2 are always connected to each other to constitute second rotary member M2; the six friction elements are constituted of a first friction element (i.e., first clutch C1) which selectively connects first pinion carrier PC1 and second pinion carrier PC2, a second friction element (i.e., second clutch C2) which selectively connects first pinion carrier PC1 and first rotary member M1, a third friction element (i.e., third clutch C3) which selectively connects second pinion carrier PC2 and third sun gear S3, a fourth friction element (i.e., fourth clutch C4) which selectively connects second pinion carrier PC2 and third pinion carrier PC3, a fifth friction element (i.e., fifth clutch C5) which selectively connects third sun gear S3 and second rotary member M2, and a sixth friction element (i.e., first brake B1) which is capable of interrupting rotation of second rotary member M2; and the at least eight forward speeds and one reverse speed are respectively established by simultaneous engagement of two friction elements selected from the six friction elements.

With this construction, the automatic transmission according to the second embodiment can reduce the number of the double-pinion planetary gearsets to be used therein, while establishing the eight forward speeds by using the three planetary gearsets and the six friction elements. As a result, the automatic transmission according to the second embodiment can have advantages of enhancing endurance reliability and cost performance. Further, since the automatic transmission according to the second embodiment can establish multiple speeds without increasing the number of planetary gear sets to be used and the number of friction elements to be used, the automatic transmission according to the second embodiment can enhance fuel economy performance and shift performance without causing expansion of unit layout and increase in cost. In addition, the automatic transmission according to the second embodiment can have advantages of enhancing gear efficiency and reducing gear noise at gear stages at which the gear ratio is high.

The automatic transmission of the present invention is not limited to the first and second embodiments as explained above, but various modifications or changes in design, etc., are possible without deviating from the scope of the invention.

Although in the first embodiment, the gear ratio p1 of first planetary gearset PG1, the gear ratio ρ2 of second planetary gearset PG2 and the gear ratio ρ3 of third planetary gearset PG3 are respectively set to the suitable values, the gear ratios ρ1, ρ2, ρ3 of the respective planetary gearsets PG1, PG2, PG3 are not limited to the specific values in the first embodiment. The respective gear ratios ρ1, ρ2, ρ3 can be set within an allowable range of values so as to obtain a high value of the RC and an appropriate value of the step ratio between the adjacent speeds.

The automatic transmission of the present invention can be applied to various vehicles such as a front-engine front-wheel-drive vehicle (i.e., a FR vehicle), a hybrid vehicle, an electric vehicle and a fuel cell powered vehicle without being particularly limited to a front-engine rear-wheel-drive vehicle (i.e., a FR vehicle) having a coaxial arrangement of the input shaft and the output shaft in the first and second embodiments.

This application is based on a prior Japanese Patent Application No. 2009-277266 filed on Dec. 7, 2009. The entire contents of the Japanese Patent Application No. 2009-277266 is hereby incorporated by reference.

Although the invention has been described above by reference to embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
a first planetary gearset including a first sun gear, a first ring gear, and a first pinion carrier as a single-pinion carrier which supports a first pinion gear, the first pinion gear meshing with the first sun gear and the first ring gear;
a second planetary gearset including a second sun gear, a second ring gear, and a second pinion carrier as a double-pinion carrier which supports second pinion gears, one of the second pinion gears meshing with the second sun gear, the other of the second pinion gears meshing with the second ring gear,
a third planetary gearset including a third sun gear, a third ring gear, and a third pinion carrier as a single-pinion carrier which supports a third pinion gear, the third pinion gear meshing with the third sun gear and the third ring gear;
an input shaft;
an output shaft; and
six friction elements,
wherein the automatic transmission is capable of shifting a gear stage to at least eight forward speeds by appropriately engaging and disengaging the six friction elements to thereby output a torque from the input shaft to the output shaft,
wherein the input shaft is always connected to the first sun gear,
wherein the output shaft is always connected to the first pinion carrier,
wherein the third sun gear is always kept in a fixed state relative to a transmission case of the automatic transmission to constitute a first fixing member,
wherein the first ring gear and the second sun gear are always connected to each other to constitute a first rotary member,
wherein the second ring gear and the third ring gear are always connected to each other to constitute a second rotary member,
wherein the six friction elements comprise a first friction element which selectively connects the second pinion carrier and the third pinion carrier, a second friction element which selectively connects the third pinion carrier and the first rotary member, a third friction element which selectively connects the first sun gear and the second pinion carrier, a fourth friction element which selectively connects the first pinion carrier and the second pinion carrier, a fifth friction element which selectively connects the first sun gear and the second rotary member, and a sixth friction element capable of interrupting rotation of the second rotary member, and
wherein the at least eight forward speeds and one reverse speed are respectively established by simultaneous engagement of two friction elements selected from the six friction elements.

2. The automatic transmission as claimed in claim 1, wherein the at least eight forward speeds comprise a first speed which is established by simultaneous engagement of the fourth friction element and the sixth friction element, a second speed which is established by simultaneous engagement of the second friction element and the sixth friction element, a third speed which is established by simultaneous engagement of the second friction element and the fourth friction element, a fourth speed which is established by simultaneous engagement of the second friction element and the third friction element, a fifth speed which is established by simultaneous engagement of the second friction element and the fifth friction element, a sixth speed which is established by simultaneous engagement of the third friction element and the fifth friction element, a seventh speed which is established by simultaneous engagement of the first friction element and the fifth friction element, and an eighth speed which is established by simultaneous engagement of the first friction element and the third friction element.

3. The automatic transmission as claimed in claim 1, wherein the one reverse speed is established by simultaneous engagement of the third friction element and the sixth friction element.

4. The automatic transmission as claimed in claim 1, wherein the first planetary gearset, the second planetary gearset, and the third planetary gearset are arranged in an order of the first planetary gearset, the second planetary gearset, and the third planetary gearset in a direction extending from the input shaft toward the output shaft, the input shaft being connected with a drive source, and the sixth friction element is disposed in an upstream position of the first planetary gearset on a side of the drive source.

* * * * *